US012469854B2

(12) United States Patent
Kim et al.

(10) Patent No.: US 12,469,854 B2
(45) Date of Patent: Nov. 11, 2025

(54) APPARATUS ACCOMMODATING COPPER FOIL

(71) Applicant: SK NEXILIS CO., LTD., Jeongeup-si (KR)

(72) Inventors: Young Tae Kim, Jeongeup-si (KR); In Soo Jung, Jeongeup-si (KR); Seung Min Kim, Jeongeup-si (KR); Young Gyu Yang, Jeongeup-si (KR)

(73) Assignee: SK NEXILIS CO., LTD., Jeongeup-si (KR)

( * ) Notice: Subject to any disclaimer, the term of this patent is extended or adjusted under 35 U.S.C. 154(b) by 1113 days.

(21) Appl. No.: 17/419,159

(22) PCT Filed: Oct. 30, 2020

(86) PCT No.: PCT/KR2020/015038

§ 371 (c)(1),
(2) Date: Jun. 28, 2021

(87) PCT Pub. No.: WO2021/096121

PCT Pub. Date: May 20, 2021

(65) Prior Publication Data

US 2022/0106152 A1 Apr. 7, 2022

(30) Foreign Application Priority Data

Nov. 13, 2019 (KR) ........................ 20-2019-0004544
Jul. 3, 2020 (KR) ........................ 20-2020-0002386

(51) Int. Cl.
*H01M 4/76* (2006.01)
*B65D 25/10* (2006.01)
(Continued)

(52) U.S. Cl.
CPC ............ *H01M 4/76* (2013.01); *B65D 25/107* (2013.01); *B65D 81/02* (2013.01); *B65D 81/07* (2013.01);
(Continued)

(58) Field of Classification Search
CPC ...... B65D 81/02; B65D 81/07; B65D 81/107; B65D 85/671–672; B65D 25/10;
(Continued)

(56) References Cited

U.S. PATENT DOCUMENTS 2,512,310 A * 6/1950 Corson .............. A47G 27/0231 D6/583
2,667,654 A * 2/1954 Goessele ................. A47L 23/24 D6/583
(Continued)

FOREIGN PATENT DOCUMENTS

AU 2015213418 A1 * 10/2016 ............. B65B 21/02
CN 201296455 Y 8/2009
(Continued)

OTHER PUBLICATIONS

Cherian, J.P. (2018). Rubberind Enterprises Anti-Vibration Ribbed Mounting Pad. [online] Rubberind.com. Available at: http://www.rubberind.com/anti-vibration-pads-ribbed-mounting-kochi-kerala-india.html [Accessed Sep. 3, 2024]. (Year: 2018).*
(Continued)

*Primary Examiner* — Orlando E Aviles
*Assistant Examiner* — Brijesh V. Patel
(74) *Attorney, Agent, or Firm* — K&L Gates LLP

(57) ABSTRACT

The present disclosure relates to an apparatus for accommodating copper foil. The apparatus includes an accommodation body in which an accommodation space for accommodating copper foil wound on a core is provided, a first support portion coupled to the accommodation body to
(Continued)

support one side of the core, a second support portion coupled to the accommodation body to support the other side of the core, a first damper portion coupled to the first support portion to be disposed between the first support portion and the one side of the core, and a second damper portion coupled to the second support portion to be disposed between the second support portion and the other side of the core, wherein the first damper portion includes a first damper body coupled to the first support portion and a plurality of first damper protrusions protruding from the first damper body.

16 Claims, 23 Drawing Sheets

(51) Int. Cl.
*B65D 81/02* (2006.01)
*B65D 81/07* (2006.01)
*B65D 85/672* (2006.01)
*B65H 75/44* (2006.01)

(52) U.S. Cl.
CPC ....... *B65D 85/672* (2013.01); *B65H 75/4471* (2013.01); *B65H 2402/30* (2013.01); *B65H 2405/44* (2013.01); *B65H 2601/25* (2013.01); *B65H 2701/173* (2013.01); *B65H 2701/1842* (2013.01); *B65H 2701/50* (2013.01)

(58) Field of Classification Search
CPC .............. B65D 25/107; B65H 75/4471; B65H 2402/30; B65H 2405/44; B65H 2601/25; B65H 2701/173; H01M 4/76
USPC ........................ 206/389, 408, 583; 211/13.1, 211/85.1–85.31, 89.01, 164; 248/560–635; 312/902; 242/160.3–160.4
See application file for complete search history.

(56) References Cited

U.S. PATENT DOCUMENTS 2,962,156 A * 11/1960 Adams .................. A45C 11/16 206/559
2,975,089 A * 3/1961 Hargreaves ........ A47G 27/0212 D25/123
3,026,224 A * 3/1962 Rogers, Jr. .............. F16F 1/376 428/167
3,332,546 A * 7/1967 De George .......... B65D 5/5057 206/395
3,436,042 A * 4/1969 Goubergen ............. F16F 1/376 248/633
3,685,644 A * 8/1972 Cothran ................. B65H 75/18 206/408
3,796,305 A * 3/1974 Beason .................. B65D 85/04 206/407
3,796,340 A * 3/1974 Piggott .................. B65D 85/04 206/509
3,998,326 A * 12/1976 McKee, Jr. ............ B65D 85/04 206/407
4,002,315 A * 1/1977 Van Goubergen ...... F16F 3/093 248/633
4,027,794 A * 6/1977 Olson .................. B65D 5/5095 206/583
4,079,835 A * 3/1978 Kendig ................ B65D 85/672 220/4.24
4,151,914 A * 5/1979 Blatt ...................... B65D 85/66 206/386
4,215,166 A * 7/1980 Bussey, Jr. .............. B29C 44/56 428/397
4,261,940 A * 4/1981 Bussey, Jr. .............. B29C 44/56 425/304
4,273,213 A * 6/1981 Munz ..................... G10K 11/16 181/207
4,651,911 A * 3/1987 Kirkup ............... B65D 83/0841 225/53
5,287,816 A * 2/1994 Jungpeter .............. B65D 19/44 108/55.1
5,415,486 A * 5/1995 Wouters ................... B41J 17/32 400/693.1
5,826,721 A * 10/1998 Fujimoto ............... B65D 19/16 220/4.28
6,382,603 B1 * 5/2002 Monson .................... F16F 7/00 248/633
6,474,473 B2 * 11/2002 Wong ................... B65D 5/5021 206/427
6,478,247 B2 * 11/2002 Fujiwara ................. B21C 47/32 242/532.3
6,805,240 B2 * 10/2004 Smarr .................... B65D 85/66 206/397
7,300,032 B2 * 11/2007 Williams ................ F16F 1/376 428/167
D657,072 S * 4/2012 West ............................ D25/139
8,336,711 B2 * 12/2012 Katsurayama ......... B65D 19/06 206/407
8,376,136 B2 * 2/2013 Arai ....................... B65D 85/42 206/419
8,497,006 B2 * 7/2013 Tomamoto ........... B65D 85/672 242/160.3
9,221,646 B1 * 12/2015 Amara ................. B65H 35/008
9,428,324 B2 * 8/2016 Jotz ...................... B65D 81/127
9,963,286 B2 * 5/2018 Corvisier ................ B65B 21/02
11,148,873 B2 * 10/2021 Machida ................ B65D 81/05
2001/0034998 A1 * 11/2001 Yamaai .................. B65D 85/66 53/409
2004/0144882 A1 * 7/2004 Small ................. B65H 35/0093 242/559
2005/0067548 A1 * 3/2005 Inoue ........................ F16L 3/26 248/68.1
2008/0116345 A1 * 5/2008 O'Malley ............. B65D 71/70 248/346.01
2011/0185871 A1 * 8/2011 Lien ......................... B26D 5/20 83/649
2012/0031791 A1 * 2/2012 Katsurayama ......... B65D 85/66 206/397
2012/0104143 A1 * 5/2012 Phelps ................... A47K 10/40 242/596.4
2013/0001179 A1 * 1/2013 Harpole ................. B65D 19/12 211/195
2014/0027553 A1 * 1/2014 Page ...................... B65H 23/06 242/159
2014/0090998 A1 * 4/2014 Kimoto .................... B65D 5/50 206/391
2014/0284236 A1 * 9/2014 Kuebart ............... B65D 81/022 206/413
2018/0361445 A1 * 12/2018 Kang ...................... C22C 38/44
2019/0062029 A1 * 2/2019 Bao ...................... B65D 81/113
2022/0106152 A1 * 4/2022 Kim ................... B65H 75/4471
2023/0028632 A1 * 1/2023 Samaras .............. B65H 16/021
2023/0073092 A1 * 3/2023 Sako ...................... B65D 19/36
2023/0257189 A1 * 8/2023 Jung .................... B65D 85/672 206/408

FOREIGN PATENT DOCUMENTS

CN 201368168 Y 12/2009
CN 201437448 U 4/2010
CN 102556524 A 7/2012
CN 202765587 U 3/2013
CN 202790271 U 3/2013
CN 203682229 U 7/2014
CN 204384095 U 6/2015
CN 104909071 A 9/2015
CN 106428988 A 2/2017
CN 109094938 A 12/2018
CN 210192286 U * 3/2020
EP 0924141 A1 * 6/1999 ............. B65D 85/66
GB 2448988 A * 11/2008 ........... B65D 25/103
JP 6219989 U 2/1987

(56) References Cited

FOREIGN PATENT DOCUMENTS

| | | | |
|---|---|---|---|
| JP | 2002205789 | A | 7/2002 |
| JP | 2006001637 | A | 1/2006 |
| JP | 2013227071 | A | 11/2013 |
| JP | 2016159971 | A | 9/2016 |
| JP | 2016196323 | A | 11/2016 |
| TW | 201544419 | A | 12/2015 |
| WO | 2005030611 | A1 | 4/2005 |
| WO | 2019088078 | A1 | 5/2019 |

OTHER PUBLICATIONS

Office Action for related Chinese Application No. 202080007558.6; action dated Mar. 14, 2023; (7 pages).
Office Action for related Chinese Application No. 202080007558.6; action dated Dec. 21, 2022; (6 pages).
Japanese Office Action for related Japanese Application No. 2021-538014; action dated Apr. 26, 2022; (3 pages).
Extended European Search Report for related European Application No. 20887330.7; action dated Aug. 12, 2022; (7 pages).
International Search Report for related International Application No. PCT/KR2020/015038; report dated May 20, 2021; (5 pages).
Written Opinion for related International Application No. PCT/KR2020/015038; report dated May 20, 2021; (4 pages).
Office Action for related Taiwan Application No. 109139735; report dated Jun. 8, 2021; (6 pages).
Chinese Office Action for related Chinese Application No. 202080007558.6; action dated Apr. 26, 2022; (7 pages).

* cited by examiner

【FIG. 1】
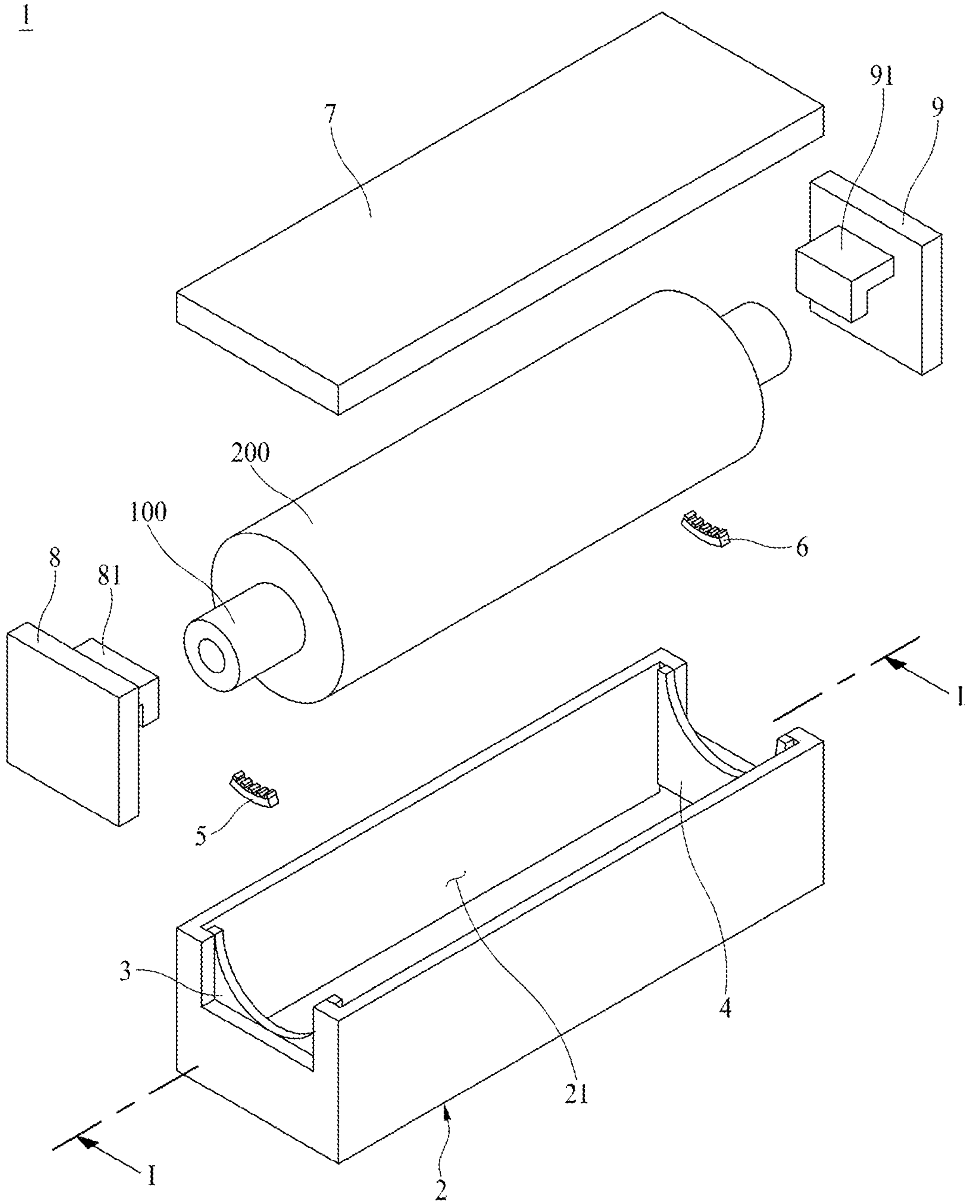

【FIG. 2】
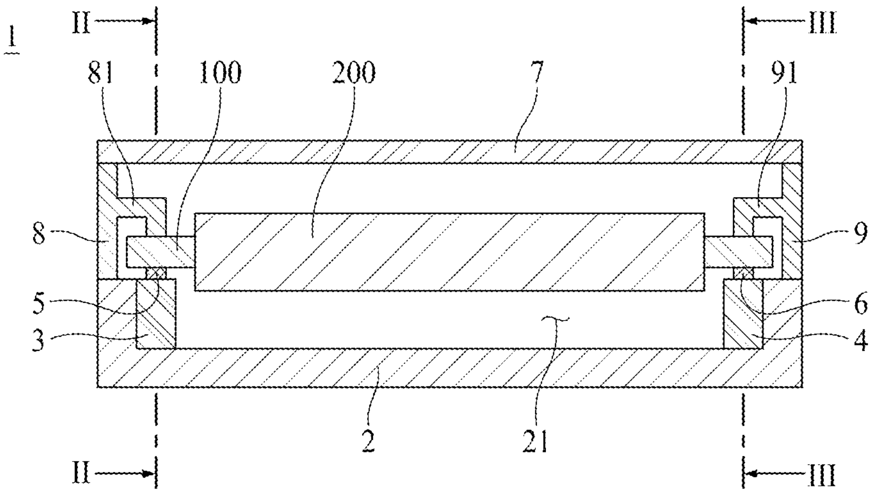

【FIG. 3】
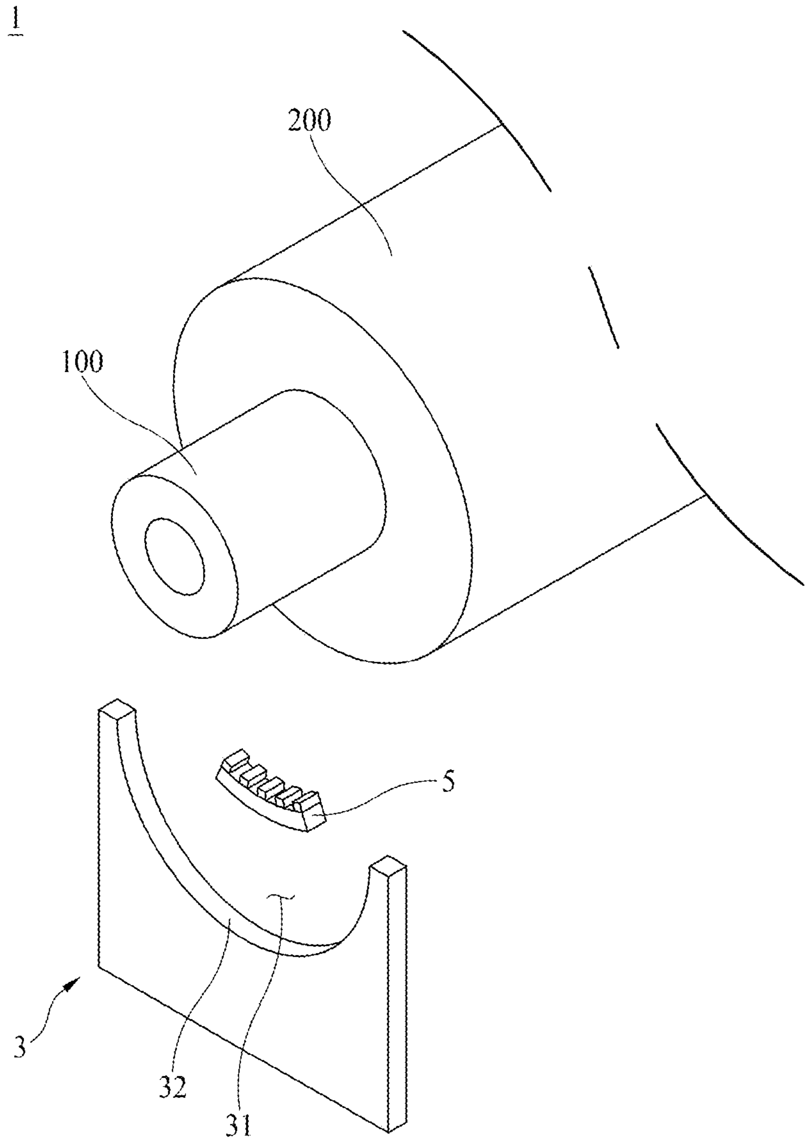

【FIG. 4】
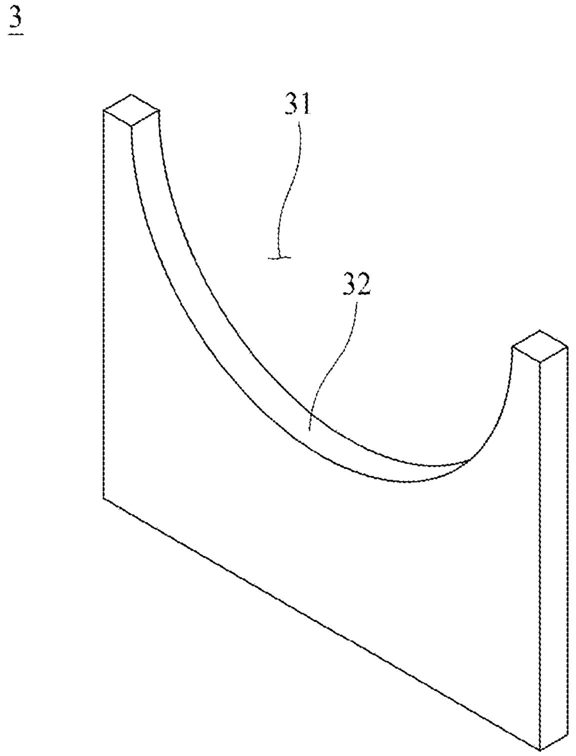

【FIG. 5】
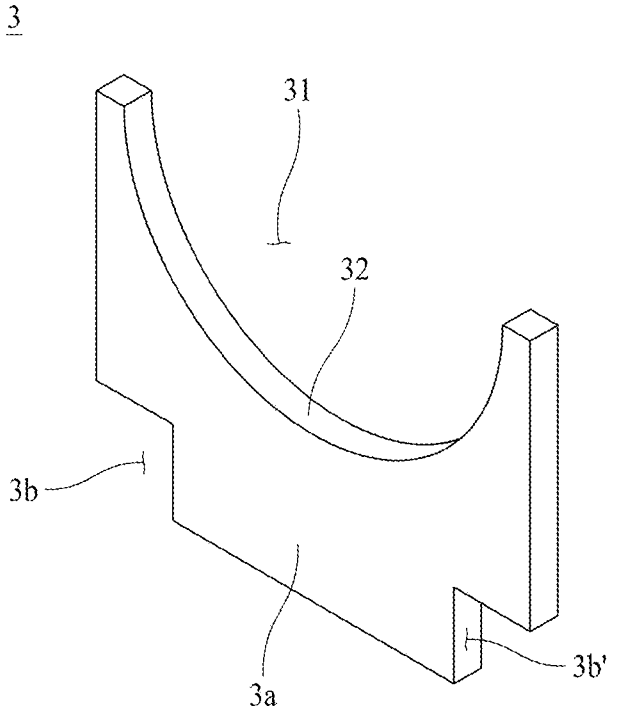

【FIG. 6】
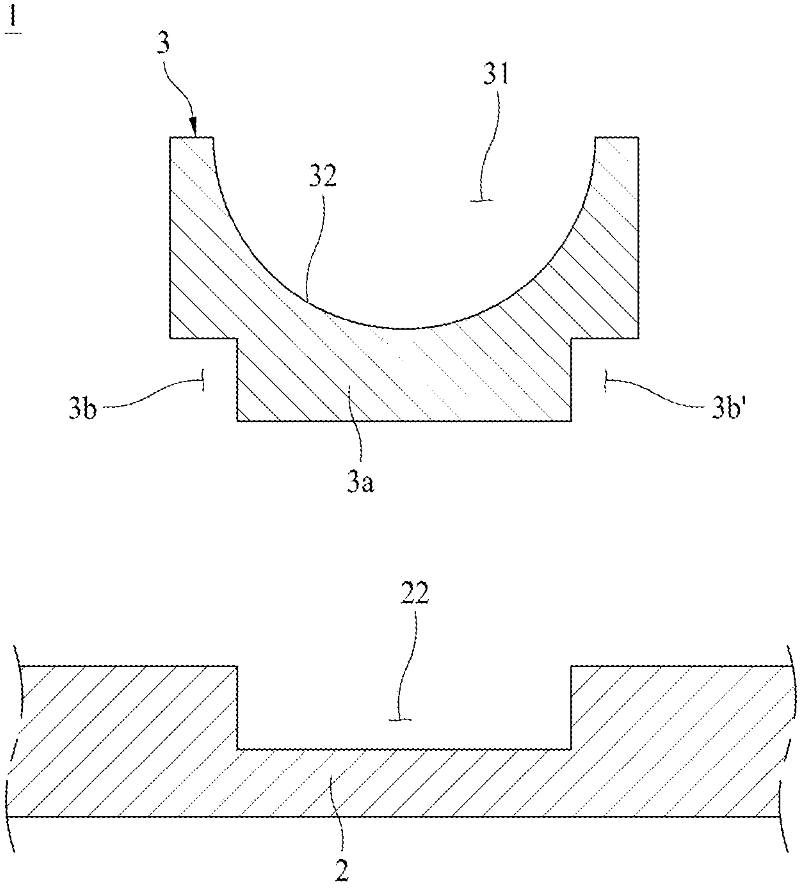

【FIG. 7】
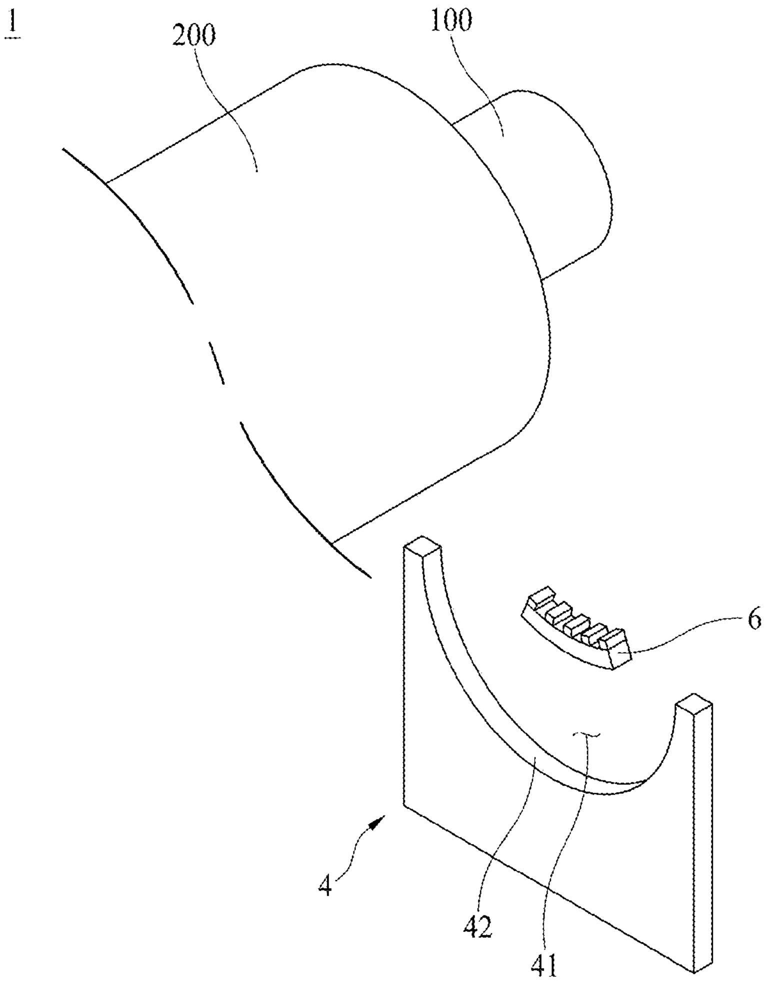

【FIG. 8】
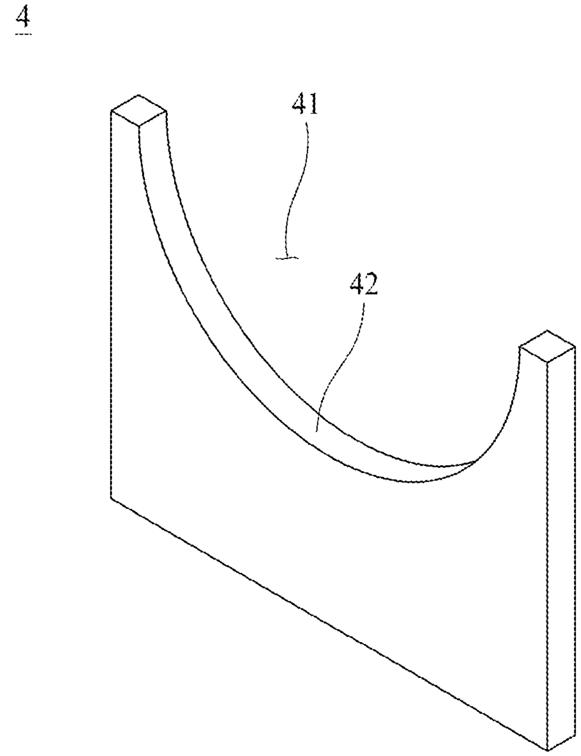

【FIG. 9】
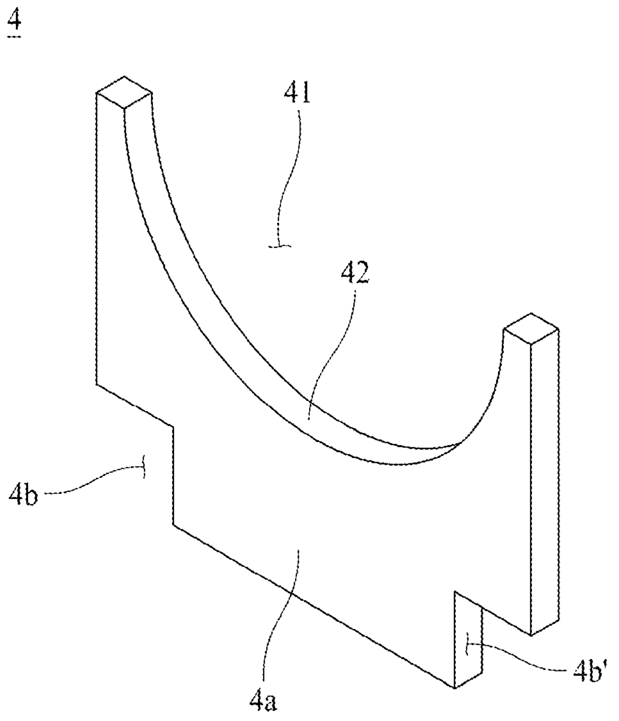

【FIG. 10】
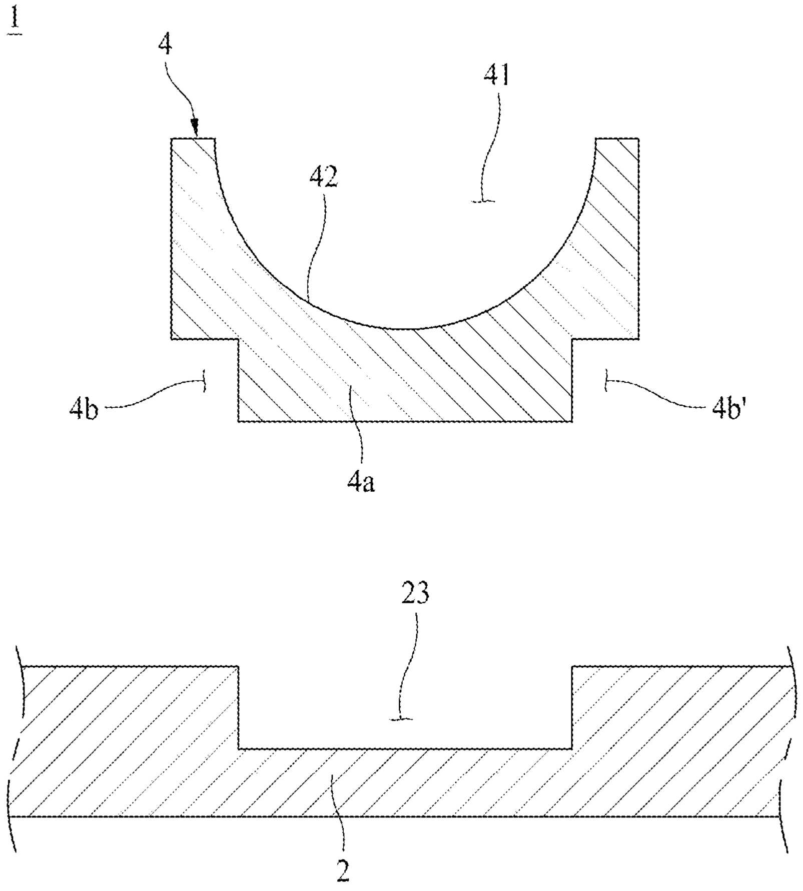

【FIG. 11】
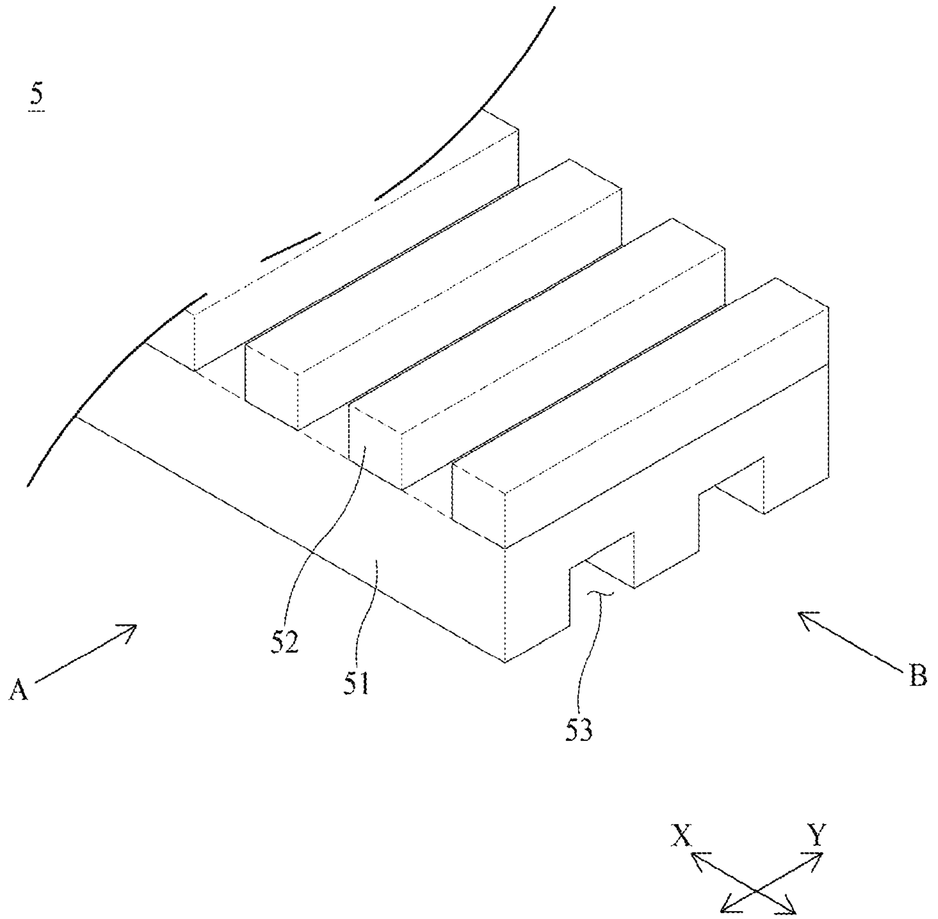

【FIG. 12】
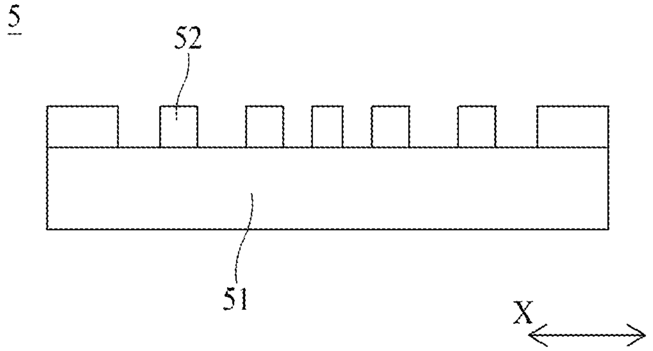
【FIG. 13】
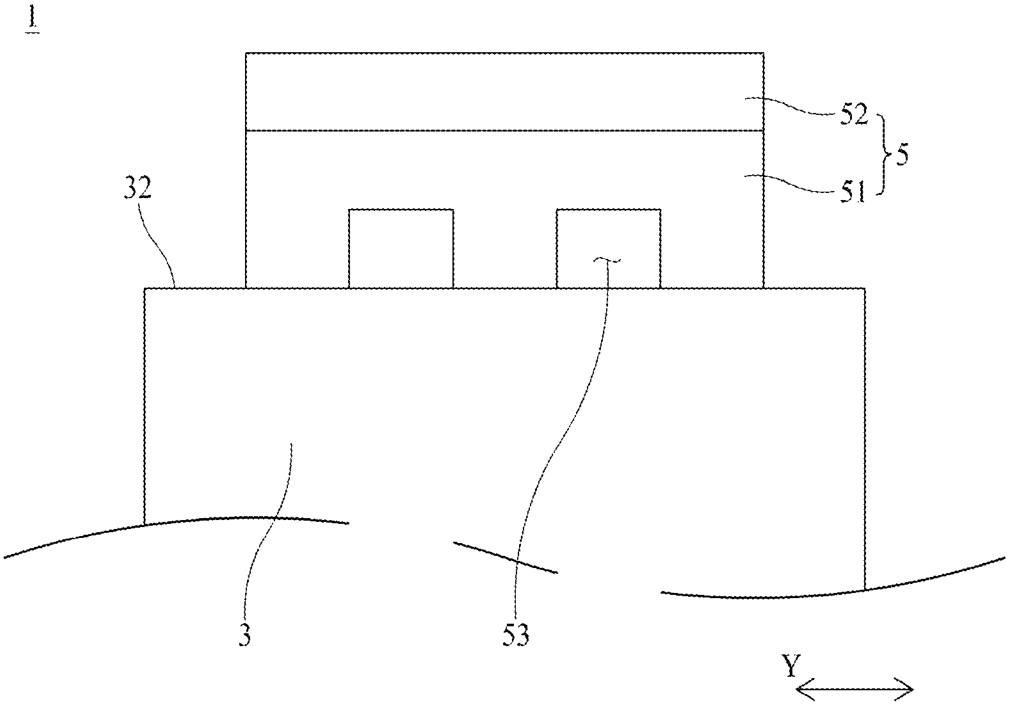

【FIG. 14】
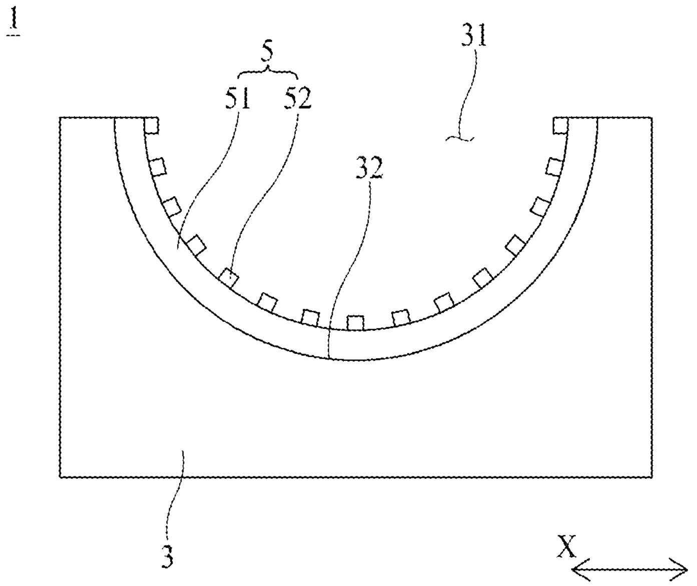
【FIG. 15】
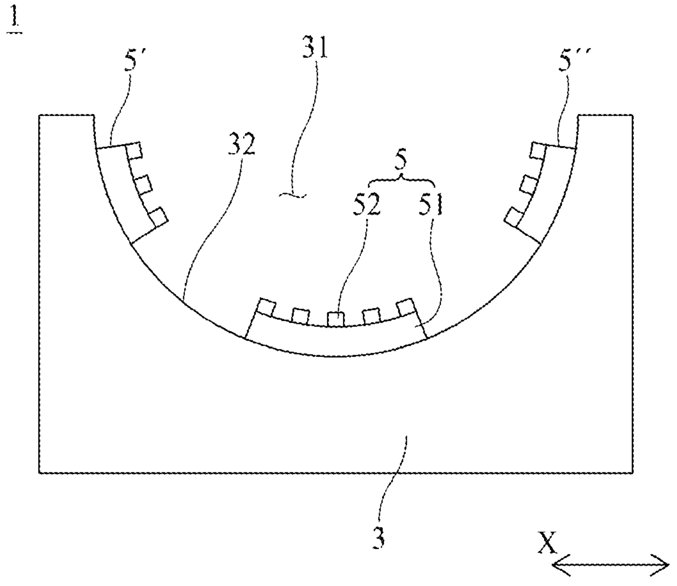

【FIG. 16】
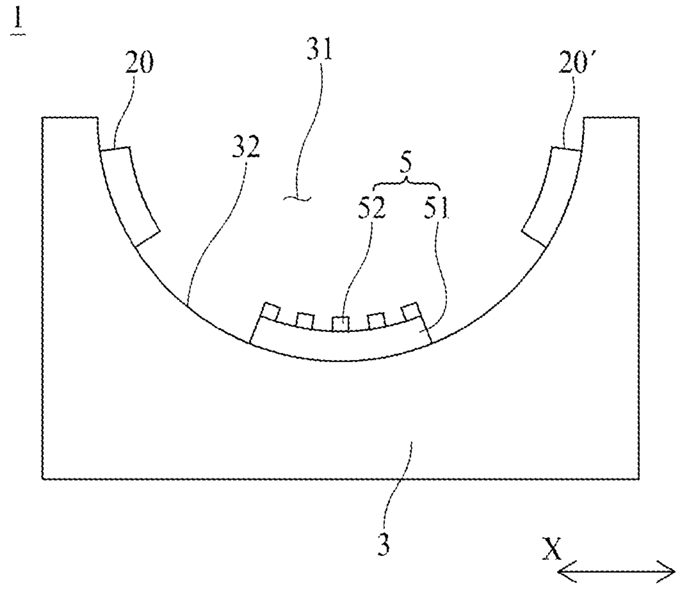
【FIG. 17】
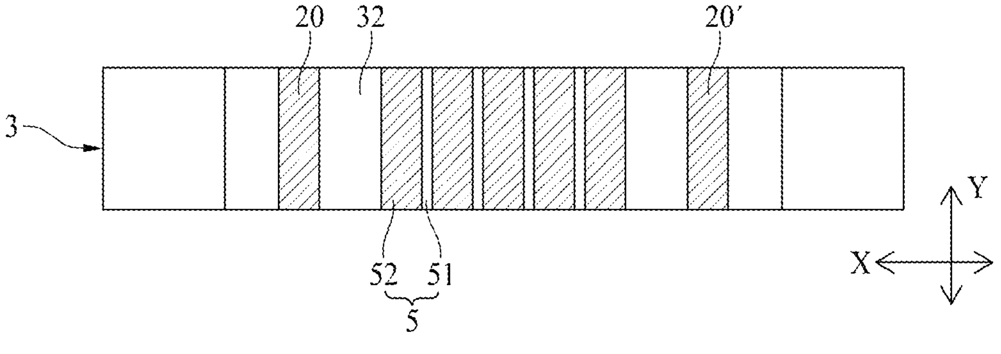

【FIG. 18】
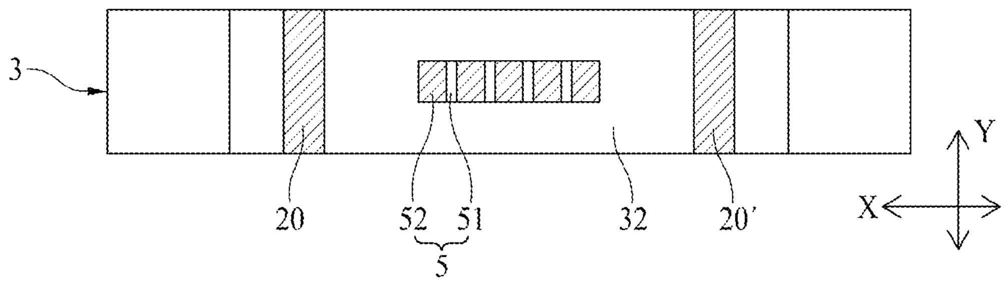
【FIG. 19】
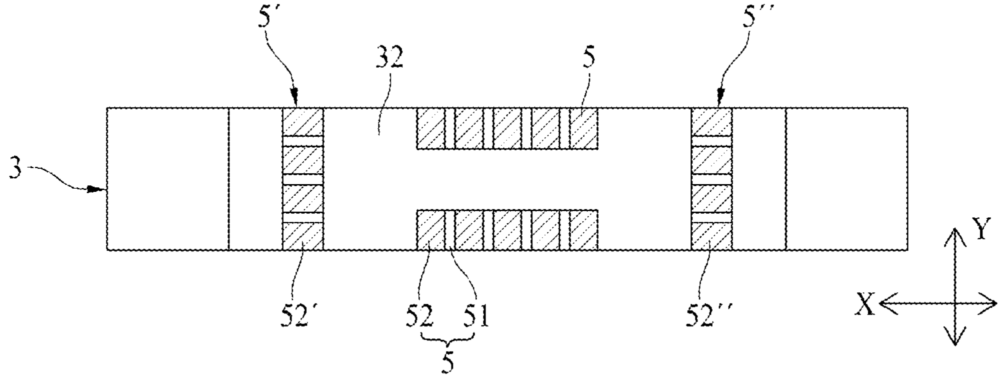
【FIG. 20】
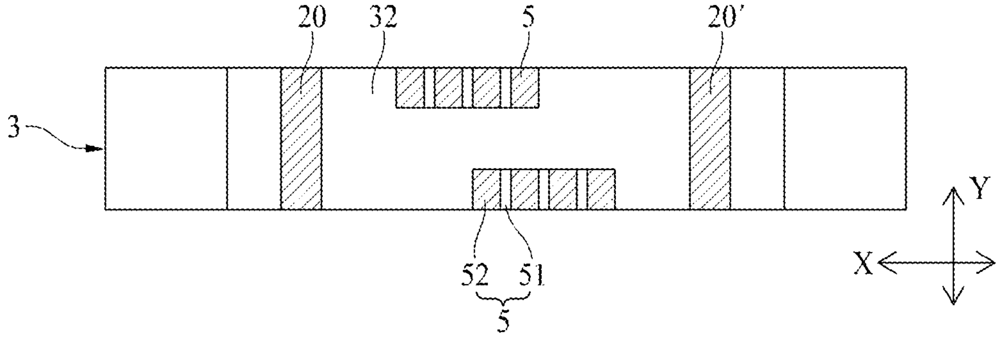

【FIG. 21】
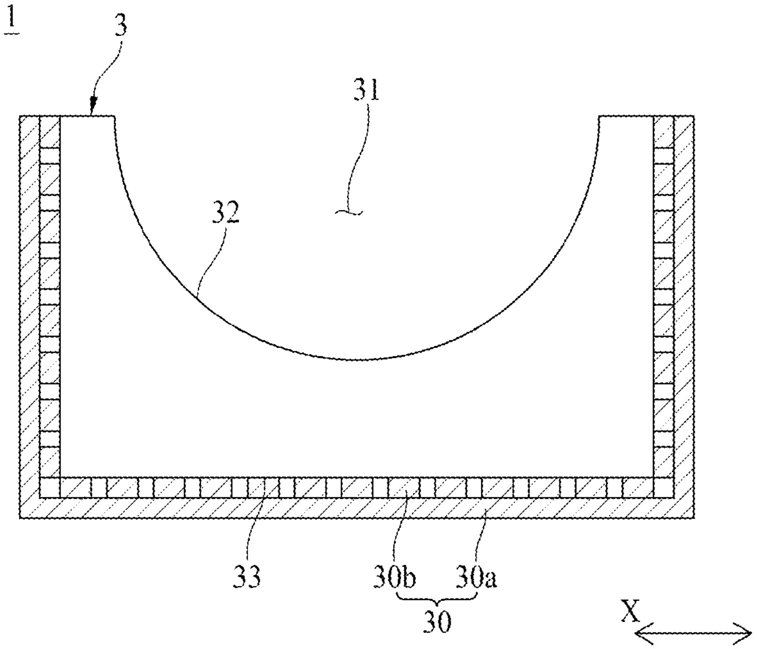

【FIG. 22】
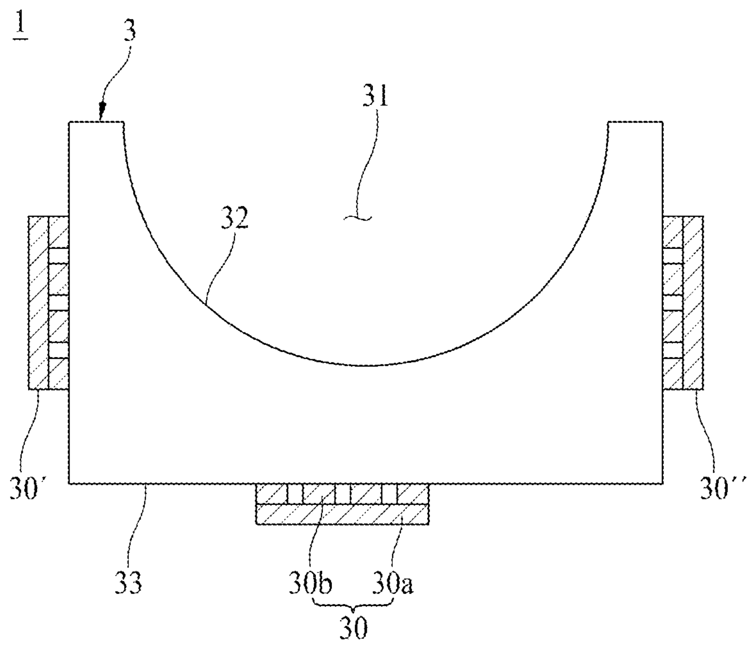

【FIG. 23】
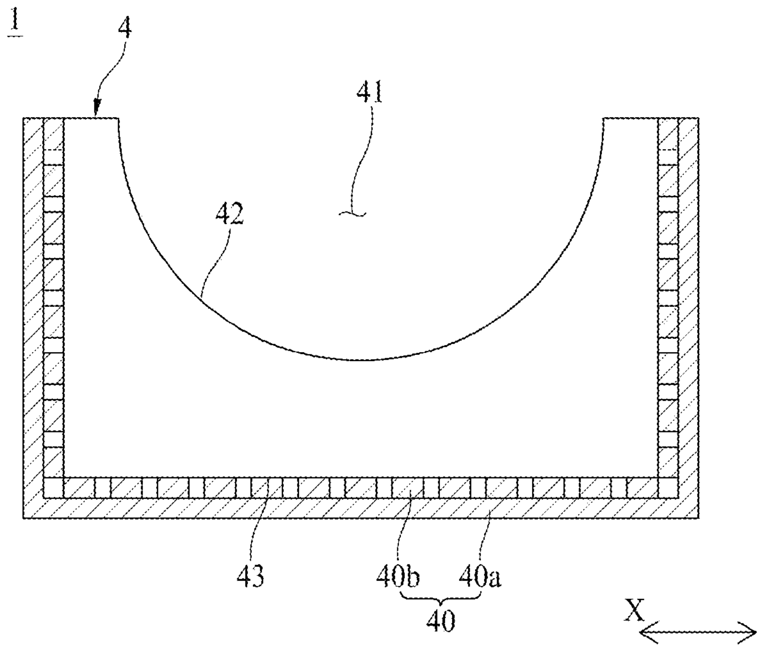

【FIG. 24】
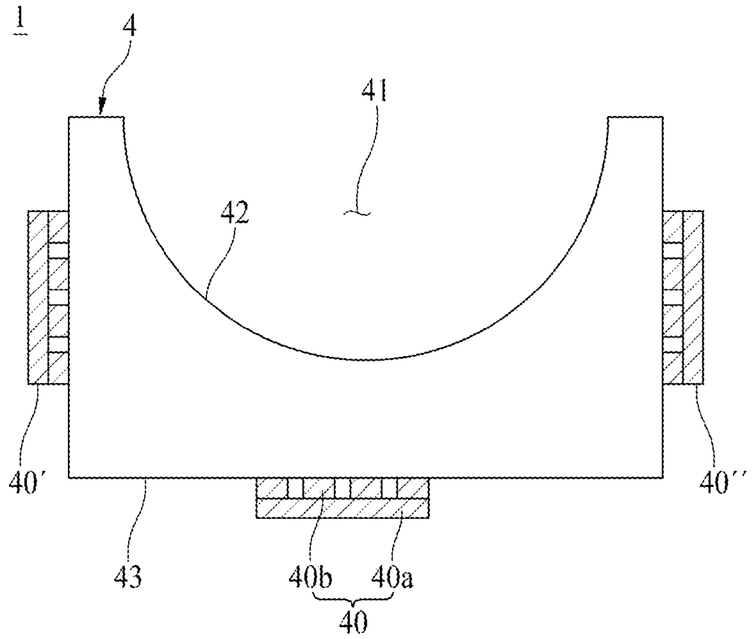

【FIG. 25】
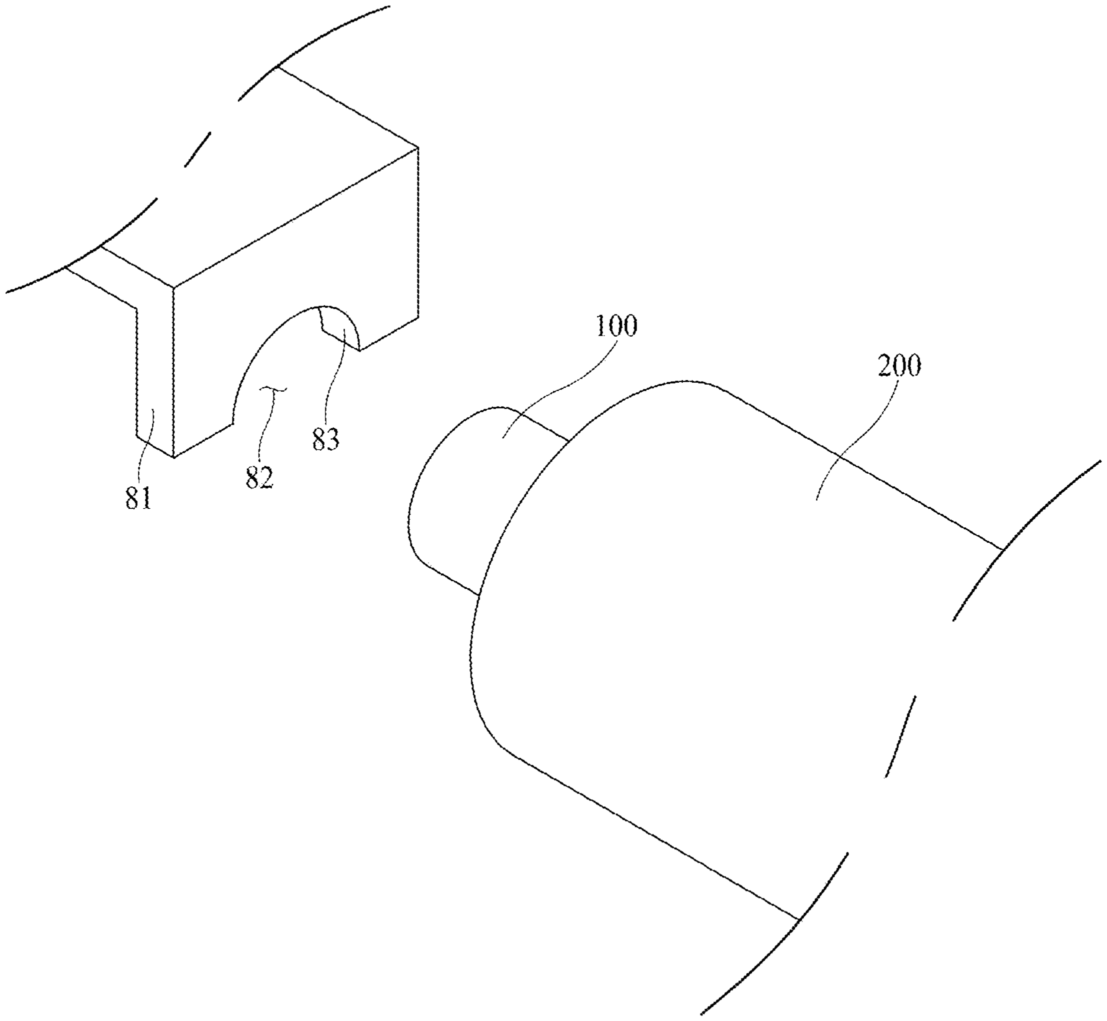

【FIG. 26】
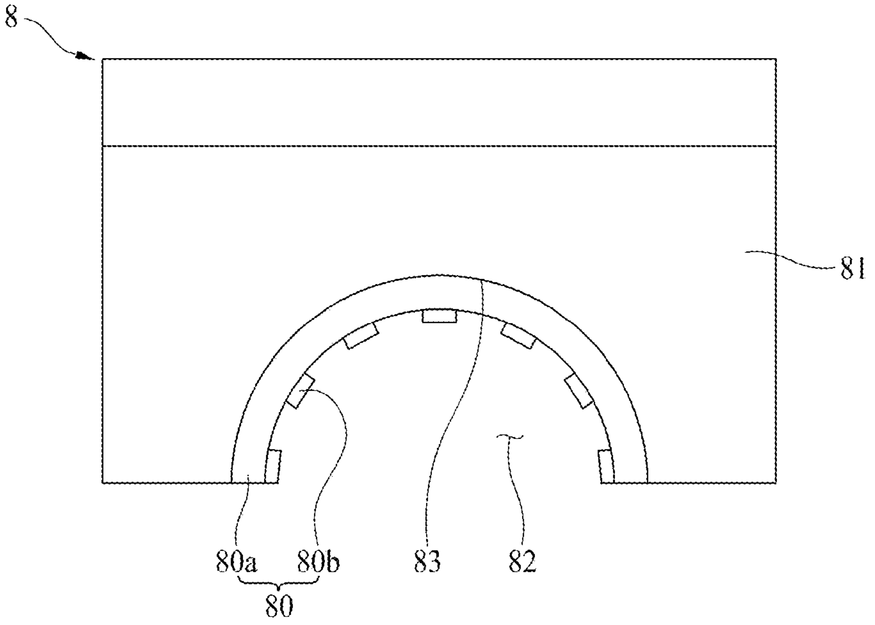

【FIG. 27】
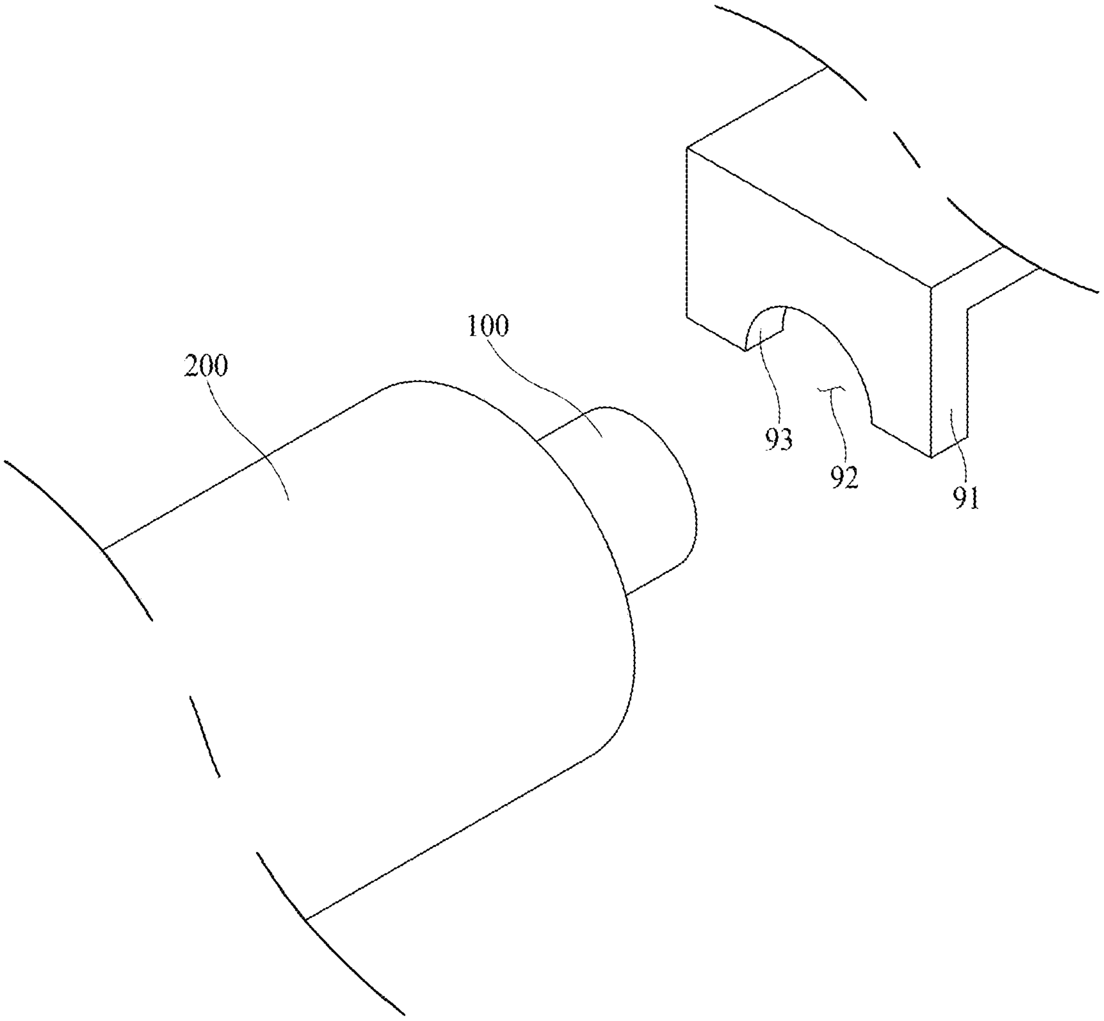

【FIG. 28】
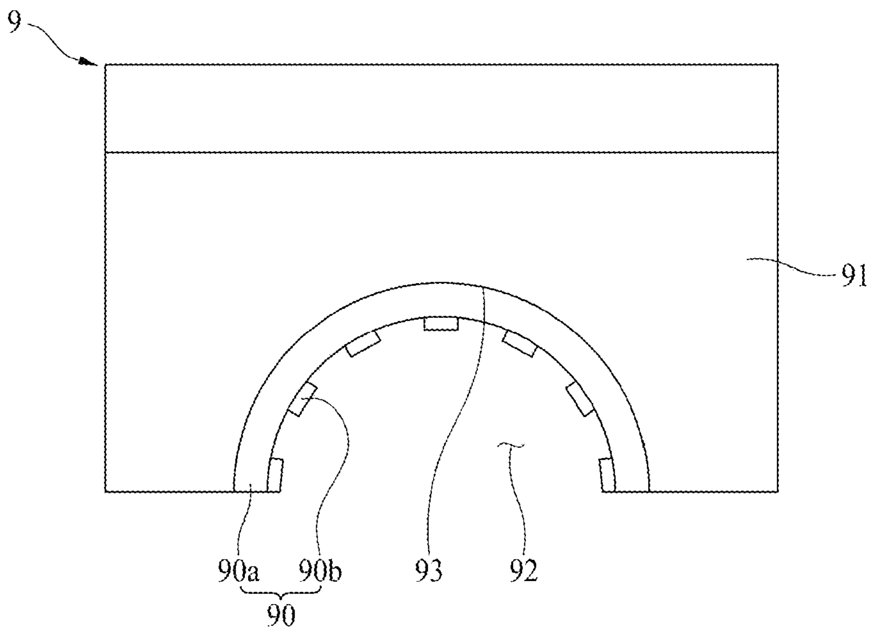

APPARATUS ACCOMMODATING COPPER FOIL

CROSS-REFERENCE TO RELATED APPLICATIONS

The present application is a National Stage of International Application No. PCT/KR2020/015038 filed on Oct. 30, 2020, which claims the benefit of Korean Patent Application No. 20-2019-0004544, filed on Nov. 13, 2019, and Korean Patent Application No. 20-2020-0002386, filed on Jul. 3, 2020 with the Korean Intellectual Property Office, the entire contents of each hereby incorporated by reference.

FIELD

The present disclosure relates to an apparatus for accommodating copper foil used for manufacturing a negative electrode for a secondary battery, a flexible printed circuit board, and the like.

BACKGROUND

Copper foil is used for manufacturing a variety of products such as a negative electrode for a secondary battery, a flexible printed circuit board (FPCB), and the like. Such copper foil is manufactured using an electroplating method in which an electrolyte is supplied between a positive electrode and a negative electrode and then a current flows therethrough. While copper foil is manufactured using the electroplating method, an electrolytic copper foil manufacturing apparatus is used.

Copper foil manufactured by the electrolytic copper foil manufacturing apparatus is transported to a customer while being wound on a core. For example, the copper foil wound on the core may be transported while being loaded on a transportation means such as a vehicle, a vessel, a railway vehicle, an aircraft, and the like.

In the above transportation process, an apparatus for accommodating copper foil serves to accommodate the copper foil wound on the core. An apparatus for accommodating copper foil according to the related art accommodates copper foil wound on a core by supporting the core protruding from both sides of the copper foil.

Accordingly, vibrations, shaking, and the like, which occur while a transportation means moves, are transferred to the core through the apparatus for accommodating copper foil and transferred to the copper foil through the core. Since the vibrations, shaking, and the like transferred to the copper foil cause a shock to the copper foil, a defect in the copper foil is caused during a transportation process.

SUMMARY

Therefore, the present disclosure is designed to solve the problems and is for providing an apparatus for accommodating copper foil, which is capable of reducing a defect rate of the copper foil occurring due to vibrations, shaking, and the like which occur during a transportation process.

To solve the above problems, the present disclosure may include the following configuration.

An apparatus for accommodating copper foil according to the present disclosure may include an accommodation body in which an accommodation space for accommodating copper foil wound on a core is provided, a first support portion coupled to the accommodation body to support one side of the core, a second support portion coupled to the accommodation body to support the other side of the core, a first damper portion coupled to the first support portion to be disposed between the first support portion and the one side of the core, and a second damper portion coupled to the second support portion to be disposed between the second support portion and the other side of the core. Here, the first damper portion may include a first damper body coupled to the first support portion and a plurality of first damper protrusions protruding from the first damper body.

According to the present disclosure, the apparatus for accommodating copper foil may have the following effects.

The present disclosure is implemented to absorb vibrations, shaking, and the like being transferred through an accommodation body and a first support portion using a first damper portion. Accordingly, since the present disclosure can reduce the level of vibrations, shaking, and the like which occur during a transportation process and are transferred to a core, it is possible to reduce a defect rate of copper foil which occurs due to the vibrations, shaking, and the like. Therefore, according to the present disclosure, not only the quality of copper foil which has been transported can be improved but also stability and ease of transport work for the copper foil can be improved.

BRIEF DESCRIPTION OF THE DRAWINGS

FIG. 1 is a schematic explosive perspective view of an apparatus for accommodating copper foil according to the present disclosure.

FIG. 2 is a schematic side cross-sectional view of the apparatus for accommodating copper foil according to the present disclosure which is taken along line I-I of FIG. 1.

FIG. 3 is a schematic perspective view of a first support portion and a first damper portion in the apparatus for accommodating copper foil according to the present disclosure.

FIGS. 4 and 5 are schematic perspective views illustrating examples of the first support portion in the apparatus for accommodating copper foil according to the present disclosure.

FIG. 6 is a schematic exploded cross-sectional view of the first support portion and an accommodation body which are taken along line II-II of FIG. 2 in the apparatus for accommodating copper foil according to the present disclosure.

FIG. 7 is a schematic perspective view of a second support portion and a second damper portion in the apparatus for accommodating copper foil according to the present disclosure.

FIGS. 8 and 9 are schematic perspective views illustrating examples of the second support portion in the apparatus for accommodating copper foil according to the present disclosure.

FIG. 10 is a schematic exploded cross-sectional view of the second support portion and the accommodation body which are taken along line of FIG. 2 in the apparatus for accommodating copper foil according to the present disclosure.

FIG. 11 is a schematic perspective view of the first damper portion in the apparatus for accommodating copper foil according to the present disclosure.

FIG. 12 is a schematic front view illustrating a modified example of the first damper portion when viewed in a direction of arrow A of FIG. 11 in the apparatus for accommodating copper foil according to the present disclosure.

FIG. 13 is a conceptual side view of the first damper portion coupled to the first support portion when viewed in a direction of arrow B of FIG. 11 in the apparatus for accommodating copper foil according to the present disclosure.

FIGS. 14 to 16 are schematic front views of the first damper portion coupled to the first support portion in the apparatus for accommodating copper foil according to the present disclosure.

FIGS. 17 to 20 are schematic plan views of the first damper portion coupled to the first support portion in the apparatus for accommodating copper foil according to the present disclosure.

FIGS. 21 and 22 are schematic front views of a first support damper coupled to the first support portion in the apparatus for accommodating copper foil according to the present disclosure.

FIGS. 23 and 24 are schematic front views of a second support damper coupled to the second support portion in the apparatus for accommodating copper foil according to the present disclosure.

FIG. 25 is a schematic perspective view of a first sidewall portion including a first sidewall groove and a first sidewall surface in the apparatus for accommodating copper foil according to the present disclosure.

FIG. 26 is a schematic front view of a first sidewall damper coupled to a first sidewall member in the apparatus for accommodating copper foil according to the present disclosure.

FIG. 27 is a schematic perspective view of a second sidewall portion including a second sidewall groove and a second sidewall surface in the apparatus for accommodating copper foil according to the present disclosure.

FIG. 28 is a schematic front view of a second sidewall damper coupled to a second sidewall member in the apparatus for accommodating copper foil according to the present disclosure.

DETAILED DESCRIPTION

Hereinafter, embodiments of an apparatus for accommodating copper foil according to the present disclosure will be described in detail with reference to the attached drawings. In FIGS. 17 to 20, hatched parts shown refer to surfaces disposed to face a core. In FIGS. 21 and 22, a first support damper is hatched to be distinguished from other components. In FIGS. 23 and 24, a second support damper is hatched to be distinguished from other components.

Referring to FIGS. 1 and 2, an apparatus 1 for accommodating copper foil (hereinafter, referred to as the copper foil accommodation apparatus 1) according to the present disclosure accommodates copper foil 200 wound on a core 100. The copper foil 200 is used for manufacturing a negative electrode for a secondary battery, a flexible printed circuit board (FPCB), and the like.

The copper foil accommodation apparatus 1 according to the present disclosure may include an accommodation body 2, a first support portion 3, a second support portion 4, a first damper portion 5, and a second damper portion 6.

Referring to FIGS. 1 and 2, the accommodation body 2 includes an accommodation space 21 configured to accommodate the copper foil 200 wound on the core 100. The accommodation body 2 may be formed to have an open top. The open top may be connected to the accommodation space 21. Accordingly, the copper foil 200 wound on the core 100 may be inserted into the accommodation space 21 through the open top of the accommodation body 2 so as to be accommodated in the accommodation body 2. When the copper foil 200 wound on the core 100 is accommodated in the accommodation body 2, a cover portion 7 may be coupled to the accommodation body 2. The cover portion 7 may block the open top of the accommodation body 2.

The accommodation body 2 may be formed to have a rectangular parallelepiped shape with an open top as a whole but is not limited thereto, and the accommodation body 2 may be formed in other shapes as long as the copper foil 200 wound around the core 100 can be accommodated therein.

Referring to FIGS. 1 to 4, the first support portion 3 is coupled to the accommodation body 2 to support one side of the core 100. The first support portion 3 may be detachably coupled to the accommodation body 2. When the first support portion 3 is coupled to the accommodation body 2, the first support portion 3 may be disposed in the accommodation space 21.

The first support portion 3 may include a first support groove 31 into which the core 100 is inserted. The first support portion 3 may be formed to have an open upper side due to the first support groove 31. Accordingly, the core 100 may be inserted into the first support groove 31 through the open upper side of the first support portion 3. The first support groove 31 may be formed to have a semicircular shape as a whole but is not limited thereto, and the first support groove 31 may be formed in other shapes as long as the core 100 can be inserted thereinto.

The first support portion 3 may include a first support surface 32. The first support surface 32 may support the core 100 inserted into the first support groove 31. The first support surface 32 may be a surface of the first support portion 3 which faces the first support groove 31. The first support surface 32 may be formed to be a curved surface.

Referring to FIGS. 1 to 6, the first support portion 3 may include a first insertion member **3*a* and a first reduction groove 3*b***.

The first insertion member **3*a* is configured to be inserted into the accommodation body 2. The first insertion member 3*a* and the first support surface 32 may be disposed opposite to each other in the first support portion 3. When the first support surface 32 is disposed at an upper portion of the first support portion 3, the first insertion member 3*a* may be disposed at a lower portion of the first support portion 3. The first reduction groove 3*b* is formed in the first insertion member 3*a*. As the first reduction groove 3*b* is formed, a size of the first insertion member 3*a* may be reduced. A plurality of such first reduction grooves 3*b* may be formed in the first insertion member 3*a*. The first reduction grooves 3*b* and 3*b*' may be disposed at positions spaced apart from each other. As shown in FIGS. 5 and 6, the first insertion member 3*a* may be formed to be disposed between the first reduction grooves 3*b* and 3*b*'**.

When the first support portion 3 includes the first insertion member **3*a* and the first reduction groove 3*b*, the accommodation body 2 may include a first insertion groove 22 (refer to FIG. 6). When the first support portion 3 is coupled to the accommodation body 2, the remaining part of the first insertion member 3*a* excluding the first reduction groove 3*b* may be inserted into the first insertion groove 22. Accordingly, the first support portion 3 may be firmly coupled to the accommodation body 2 using an insertion structure between the first insertion member 3*a* and the first insertion groove 22. Accordingly, the first support portion 3 may be firmly maintained while supporting the one side of the core 100. The first insertion groove 22 may be formed in a bottom surface in the accommodation body 2**.

Referring to FIGS. 1, 2, 7, and 8, the second support portion 4 is coupled to the accommodation body 2 to support the other side of the core 100. The second support portion 4 may be detachably coupled to the accommodation body 2. When the second support portion 4 is coupled to the accommodation body 2, the second support portion 4 may be disposed in the accommodation space 21.

The second support portion 4 may include a second support groove 41 into which the core 100 is inserted. The second support portion 4 may be formed to have an open upper side due to the second support groove 41. Accordingly, the core 100 may be inserted into the second support groove 41 through the open upper side of the second support portion 4. The second support groove 41 may be formed to have a semicircular shape as a whole but is not limited thereto, and the second support groove 41 may be formed in other shapes as long as the core 100 can be inserted thereinto.

The second support portion 4 may include a second support surface 42. The second support surface 42 may support the core 100 inserted into the second support groove 41. The second support surface 42 may be a surface of the second support portion 4 which faces the second support groove 41. The second support surface 42 may be formed to be a curved surface.

Referring to FIGS. 1, 2, and 7 to 10, the second support portion 4 may include a second insertion member 4*a* and a second reduction groove 4*b*.

The second insertion member 4*a* is configured to be inserted into the accommodation body 2. The second insertion member 4*a* and the second support surface 42 may be disposed opposite to each other in the second support portion 4. When the second support surface 42 is disposed at an upper portion of the second support portion 4, the second insertion member 4*a* may be disposed at a lower portion of the second support portion 4.

The second reduction groove 4*b* is formed in the second insertion member 4*a*. As the second reduction groove 4*b* is formed, a size of the second insertion member 4*a* may be reduced. A plurality of such second reduction grooves 4*b* may be formed in the second insertion member 4*a*. The second reduction grooves 4*b* and 4*b*' may be disposed at positions spaced apart from each other. As shown in FIGS. 9 and 10, the second insertion member 4*a* may be formed to be disposed between the second reduction grooves 4*b* and 4*b*'.

When the second support portion 4 includes the second insertion member 4*a* and the second reduction groove 4*b*, the accommodation body 2 may include a second insertion groove 23 (refer to FIG. 10). When the second support portion 4 is coupled to the accommodation body 2, the remaining part of the second insertion member 4*a* excluding the second reduction groove 4*b* may be inserted into the second insertion groove 23. Accordingly, the second support portion 4 may be firmly coupled to the accommodation body 2 using an insertion structure between the second insertion member 4*a* and the second insertion groove 23. Accordingly, the second support portion 4 may be firmly maintained while supporting the other side of the core 100. The second insertion groove 23 may be formed in the bottom surface in the accommodation body 2.

Referring to FIGS. 1 to 13, the first damper portion 5 may be disposed between the first support portion 3 and the one side of the core 100. The first damper portion 5 may be coupled to the first support portion 3. The first damper portion 5 may be coupled to the first support portion 3 using an adhesive force. The first damper portion 5 may be coupled to the first support surface 32. The first damper portion 5 is formed to have a linear shape as shown in FIG. 12, and may be bent and deformed to be a curved shape according to a curvature of the first support surface 32 as being coupled to the first support surface 32. The first damper portion 5 may be formed of an elastically deformable material. For example, the first damper portion 5 may be formed of rubber, urethane, or the like.

When the copper foil 200 wound on the core 100 is accommodated in the accommodation space 21, the first damper portion 5 may come into contact with the one side of the core 100 between the first support surface 32 and the one side of the core 100. Accordingly, when vibrations, shaking, and the like occur during a transportation process using a transportation means such as a vehicle, a vessel, a railway vehicle, an aircraft, and the like, the first damper portion 5 may absorb vibrations, shaking, and the like transferred through the accommodation body 2 and the first support portion 3. Accordingly, the first damper portion 5 may reduce the level of vibrations, shaking, or the like being transferred to the one side of the core 100. Accordingly, the copper foil accommodation apparatus 1 according to the present disclosure may reduce a defect rate of the copper foil 200 occurring due to vibrations, shaking, and the like which occur during the transportation process. Accordingly, the copper foil accommodation apparatus 1 according to the present disclosure may improve the quality of the copper foil 200 which has been transported as well as improve stability and ease of transport work for the copper foil 200.

The first damper portion 5 may include a first damper body 51 and a plurality of first damper protrusions 52.

The first damper body 51 is coupled to the first support portion 3. The first damper body 51 may be coupled to the first support surface 32. The first damper body 51 may be coupled to the first support surface 32 using an adhesive force. The first damper body 51 may be coupled to the first support surface 32 using an additional first fixing member (not shown). The first fixing member may be inserted into the first damper body 51 and the first support portion 3 between the first damper protrusions 52 so as to fix the first damper portion 5 to the first support portion 3. For example, the first fixing member may be implemented as a staple or the like which is fixedly insertable into the first damper body 51 and the first support portion 3.

The first damper protrusions 52 protrude from the first damper body 51. The first damper protrusions 52 may protrude upward from a top surface of the first damper body 51. The first damper protrusions 52 may be disposed to be spaced apart from each other. Accordingly, the first damper protrusions 52 may come into contact with mutually different parts of the one side of the core 100. A contact area of the first damper portion 5 which comes into contact with the one side of the core 100 may be reduced using the first damper protrusions 52. Also, elastic deformation for each of the first damper protrusions 52 may be further smoothly performed. Accordingly, the first damper portion 5 may be implemented to further reduce the level of vibrations, shaking, or the like being transferred to the one side of the core 100. The first damper protrusions 52 may be formed to have a rectangular parallelepiped shape as a whole but is not limited thereto, and may be formed in other shapes capable of reducing the level of vibrations, shaking, and the like being transferred to the one side of the core 100. For example, the first damper protrusions 52 may be formed to have a size which is reduced when gradually protruding upward from the first damper body 51. In this case, parts of the first damper protrusions 52 which come into contact with the one side of the core 100 may be formed to have curved surfaces.

The first damper protrusions 52 may be disposed to be spaced apart from each other in a first axial direction (X-axis direction). The first damper protrusions 52 may be formed to have a greater length in a second axial direction (Y-axis direction) in comparison to a length in the first axial direction (X-axis direction). The second axial direction (Y-axis direction) and the first axial direction (X-axis direction) are perpendicular to each other in one plane. When the first damper portion 5 is coupled to the first support portion 3, the copper foil 200 may be accommodated in the accommodation body 2 to be parallel to the second axial direction (Y-axis direction).

The first damper protrusions 52 may be formed to have the same length on the basis of the first axial direction (X-axis direction). As shown in FIG. 12, the first damper protrusions 52 which are disposed further outward from a central point CP on the basis of the first axial direction (X-axis direction) may be formed to have a greater length. The central point CP means a point spaced at the same distance apart from the both ends of the first damper body 51 on the basis of the first axial direction (X-axis direction). Also, when being further outward from the central point CP on the basis of the first axial direction (X-axis direction), a gap between the first damper protrusions 52 may increase.

The first damper portion 5 may include a plurality of first damper grooves 53. The remaining part of the first damper portion 5 excluding parts in which the first damper grooves 53 are formed may be coupled to the first support portion 3. The first damper grooves 53 may be formed in a bottom surface of the first damper body 51. The first damper grooves 53 may be formed to have a rectangular parallelepiped shape parallel to the first axial direction (X-axis direction). The first damper grooves 53 may be disposed to be spaced apart from each other in the second axial direction (Y-axis direction). A contact area of the first damper portion 5 which comes into contact with the first support portion 3 may be reduced using the first damper grooves 53. Also, elastic deformation for the first damper body 51 may be more smoothly performed due to the first damper grooves 53. Accordingly, the first damper portion 5 is implemented to reduce the level of vibrations, shaking, or the like being transferred from the first damper body 51 to the first damper protrusions 52 so as to further reduce the level of vibrations, shaking, or the like transferred to the one side of the core 100. The first damper grooves 53 may be formed to have a rectangular parallelepiped shape as a whole but is not limited thereto, and may be formed in other shapes capable of reducing the level of vibrations, shaking, and the like being transferred. For example, the first damper grooves 53 may be formed to have a size which is reduced when gradually receding upward from the first damper body 51. In this case, an inner wall of the first damper body 51 in which the first damper grooves 53 are formed may be formed to have a curved surface.

As shown in FIG. 14, the first damper portion 5 may be coupled to the first support portion 3 to cover an entire surface of the first support surface 32. In this case, the first damper protrusions 52 may be disposed to be spaced apart from each other along a curvature of the first support surface 32.

As shown in FIG. 15, the first damper portion 5 may be coupled to the first support portion 3 to cover a part of the first support surface 32. When the copper foil 200 wound on the core 100 is accommodated in the accommodation space 21, the first damper portion 5 may be coupled to the first support portion 3 to be disposed below the one side of the core 100.

Here, the copper foil accommodation apparatus 1 according to the present disclosure may include a plurality of such first damper portions 5. The first damper portions 5, 5', and 5" may be coupled to the first support surface 32 at positions spaced apart from one other. Although three first damper portions 5, 5', and 5" are coupled to the first support surface 32 in FIG. 15, the present disclosure is not limited thereto and two or four or more first damper portions 5 may be coupled to the first support surface 32.

When the copper foil accommodation apparatus 1 according to the present disclosure includes the first damper portions 5, 5', and 5", the first damper portion 5 may be disposed below the one side of the core 100 and the first damper portions 5', and 5" may be disposed on both sides of the first damper portion 5 on the basis of the first axial direction (X-axis direction). The first damper portions 5' and 5" may be disposed to be spaced apart ambilaterally from the one side of the core 100. The first damper portions 5' and 5" may come into contact with the one side of the core 100.

As shown in FIG. 15, all the first damper portions 5, 5', and 5" may be implemented to have the first damper protrusions 52.

As shown in FIG. 16, the copper foil accommodation apparatus 1 according to the present disclosure may be implemented through a combination of the first damper portion 5 and a first auxiliary damper 20. Unlike the first damper portion 5 implemented to come into partial contact with the one side of the core 100 using the first damper protrusions 52, the first auxiliary damper 20 may be formed to come into entire contact with the one side of the core 100. That is, the first auxiliary damper 20 may be implemented without the first damper protrusions 52. In this case, a surface of the first auxiliary damper 20 which comes into contact with the one side of the core 100 may be formed to have a curved surface. Since the manufacturing costs of the first auxiliary damper 20 is lower than that of the first damper portion 5, the manufacturing costs of the copper foil accommodation apparatus 1 according to the present disclosure may be reduced through the combination of the first auxiliary damper 20 and the first damper portion 5. The first auxiliary damper 20 and the first damper portion 5 may be formed of different materials. The copper foil accommodation apparatus 1 according to the present disclosure may include a plurality of such first auxiliary dampers 20. In this case, the first damper portion 5 may be disposed below the one side of the core 100, and the first auxiliary dampers 20 and 20' may be disposed on both sides of the first damper portion 5 on the basis of the first axial direction (X-axis direction). The first auxiliary dampers 20 and 20' may be disposed to be spaced apart ambilaterally from the one side of the core 100. The first auxiliary dampers 20 and 20' may come into contact with the one side of the core 100.

As shown in FIG. 17, on the basis of the second axial direction (Y-axis direction), the first damper portion 5 may be formed to have the same length as that of the first support surface 32. The first damper portion 5 may be disposed at a middle position spaced at the same distance apart from both ends of the first support portion 3 on the basis of the first axial direction (X-axis direction). The first auxiliary dampers 20 and 20' may be disposed on both sides of the first damper portion 5 on the basis of the first axial direction (X-axis direction). On the basis of the second axial direction (Y-axis direction), the first auxiliary dampers 20 and 20' may be formed to have the same length as that of the first support surface 32. Although not shown in the drawing, the first damper portions 5' and 5" (refer to FIG. 15) may be additionally disposed on both sides of the first damper portion 5 on the basis of the first axial direction (X-axis direction).

As shown in FIG. 18, on the basis of the second axial direction (Y-axis direction), the first damper portion 5 may be formed to have a smaller length than that of the first support surface 32. The first damper portion 5 may be disposed at the middle position on the basis of the first axial direction (X-axis direction). The first damper portion 5 may be disposed at a position spaced at the same distance apart from both ends of the first support portion 3 on the basis of the second axial direction (Y-axis direction). The first auxiliary dampers 20 and 20' may be disposed on both sides of the first damper portion 5 on the basis of the first axial direction (X-axis direction). On the basis of the second axial direction (Y-axis direction), the first auxiliary dampers 20 and 20' may be formed to have the same length as that of the first support surface 32. Although not shown in the drawing, the first damper portions 5' and 5" (refer to FIG. 15) may be additionally disposed on both sides of the first damper portion 5 on the basis of the first axial direction (X-axis direction).

As shown in FIG. 19, on the basis of the second axial direction (Y-axis direction), the first damper portion 5 may be formed to have a smaller length than that of the first support surface 32. The first damper portion 5 may be disposed at the middle position on the basis of the first axial direction (X-axis direction). A plurality of first damper portions 5 may be disposed at the middle position. The first damper portions 5 may be disposed in the middle position to be spaced apart from each other in the second axial direction (Y-axis direction). The first damper portions 5' and 5" may be additionally disposed on both sides of the first damper portions 5 on the basis of the first axial direction (X-axis direction). The first damper portions 5' and 5" may be disposed so that first damper protrusions 52' and 52" are spaced apart from each other in the second axial direction (Y-axis direction). Although not shown in the drawing, the first auxiliary dampers 20 and 20' (refer to FIG. 18) may be disposed on both sides of the first damper portions 5 on the basis of the first axial direction (X-axis direction).

As shown in FIG. 20, on the basis of the second axial direction (Y-axis direction), the first damper portion 5 may be formed to have a smaller length than that of the first support surface 32. The first damper portion 5 may be disposed at the middle position on the basis of the first axial direction (X-axis direction). A plurality of first damper portions 5 may be disposed at the middle position. The first damper portions 5 may be disposed at the middle position to be spaced apart from each other in the second axial direction (Y-axis direction). The first damper portions 5 may be disposed at different distances apart from one end of the first support portion 3 on the basis of the first axial direction (X-axis direction). That is, the first damper portions 5 may be disposed at positions offset from each other on the basis of the first axial direction (X-axis direction). The first auxiliary dampers 20 and 20' may be disposed on both sides of the first damper portions 5 on the basis of the first axial direction (X-axis direction). Although not shown in the drawing, the first damper portions 5' and 5" (refer to FIG. 19) may be additionally disposed on both sides of the first damper portions 5 on the basis of the first axial direction (X-axis direction).

Referring to FIGS. 1 to 20, the second damper portion 6 is coupled to the second support portion 4. Since the second damper portion 6 may be implemented to be approximately equal to the first damper portion 5 without being coupled to the second support portion 4 to support the other side of the core 100, a detailed description thereof will be omitted.

Referring to FIGS. 1 and 2, the copper foil accommodation apparatus 1 according to the present disclosure may include a first sidewall portion 8 and a second sidewall portion 9.

The first sidewall portion 8 may be detachably coupled to one side of the accommodation body 2. When the first sidewall portion 8 is coupled to the one side of the accommodation body 2, the one side of the accommodation body 2 may be closed. The first sidewall portion 8 may be disposed at a position spaced apart from the one side of the core 100 accommodated in the accommodation space 21.

The first sidewall portion 8 may include a first sidewall member 81. The first sidewall member 81 protrudes from the first sidewall portion 8. When the first sidewall portion 8 is coupled to the one side of the accommodation body 2, the first sidewall member 81 may be disposed above the one side of the core 100. In this case, the one side of the core 100 may be disposed between the first sidewall member 81 and the first damper portion 5. Accordingly, the copper foil accommodation apparatus 1 according to the present disclosure may reinforce a supporting force for the one side of the core 100.

The second sidewall portion 9 may be detachably coupled to the other side of the accommodation body 2. When the second sidewall portion 9 is coupled to the other side of the accommodation body 2, the other side of the accommodation body 2 may be closed. The second sidewall portion 9 may be disposed at a position spaced apart from the other side of the core 100 accommodated in the accommodation space 21.

The second sidewall portion 9 may include a second sidewall member 91. The second sidewall member 91 protrudes from the second sidewall portion 9. When the second sidewall portion 9 is coupled to the other side of the accommodation body 2, the second sidewall member 91 may be disposed above the other side of the core 100. In this case, the other side of the core 100 may be disposed between the second sidewall member 91 and the second damper portion 6. Accordingly, the copper foil accommodation apparatus 1 according to the present disclosure may reinforce a supporting force for the other side of the core 100.

Referring to FIGS. 2, 21, and 22, the copper foil accommodation apparatus 1 according to the present disclosure may include a first support damper 30.

The first support damper 30 may be coupled to the first support portion 3. When the first support portion 3 is coupled to the accommodation body 2, the first support damper 30 may be disposed between the first support portion 3 and the accommodation body 2. The first support damper 30 may be formed of an elastically deformable material. For example, the first support damper 30 may be formed of rubber, urethane, or the like.

The first support damper 30 may be coupled to a first outer surface 33 of the first support portion 3. When the first support portion 3 is coupled to the accommodation body 2, the first outer surface 33 is a surface facing the accommodation body 2. Accordingly, when the first support portion 3 is coupled to the accommodation body 2, the first support damper 30 may be disposed between the first outer surface 33 and the accommodation body 2. Accordingly, the first support damper 30 may absorb vibrations, shaking, and the like which are transferred through the accommodation body 2. Accordingly, the first support damper 30 may reduce the level of vibrations, shaking, and the like being transferred to the first support portion 3 so as to reduce the level of vibrations, shaking, and the like being transferred to the one side of the core 100. Accordingly, the copper foil accommodation apparatus 1 according to the present disclosure may reduce a defect rate of the copper foil 200 occurring due to vibrations, shaking, and the like which occur during the transportation process. Accordingly, the copper foil accommodation apparatus 1 according to the present disclosure may improve the quality of the copper foil 200 which has been transported as well as improve stability and ease of transport work for the copper foil 200.

The first support damper 30 may include a first support body 30*a* and a plurality of first support protrusions 30*b*.

The first support body 30*a* is disposed to face the accommodation body 2. When the first support portion 3 is coupled to the accommodation body 2, the first support body 30*a* may come into contact with the accommodation body 2.

The first support protrusions 30*b* protrude from the first support body 30*a*. The first support protrusions 30*b* may protrude from the first support body 30*a* toward the first support portion 3. The first support protrusions 30*b* may be disposed to be spaced apart from each other. Accordingly, the first support protrusions 30*b* may come into contact with mutually different parts of the first support portion 3. A contact area of the first support damper 30 which comes into contact with the first support portion 3 may be reduced using the first support protrusions 30*b*. Also, elastic deformation for each of the first support protrusions 30*b* may be further smoothly performed. Accordingly, the first support damper 30 may be implemented to further reduce the level of vibrations, shaking, or the like being transferred to the first support portion 3.

As shown in FIG. 21, the first support damper 30 may be coupled to the first support portion 3 to cover an entire surface of the first outer surface 33.

As shown in FIG. 22, the first support damper 30 may be coupled to the first support portion 3 to cover a part of the first outer surface 33. In this case, the copper foil accommodation apparatus 1 according to the present disclosure may include a plurality of such first support dampers 30. The first support dampers 30, 30', and 30" may be disposed on the first outer surface 33 at positions spaced apart from one another.

Although not shown in the drawings, the first support damper 30 may be implemented to include only the first support body 30*a* without the first support protrusions 30*b*. Although not shown in the drawings, the copper foil accommodation apparatus 1 according to the present disclosure may be implemented to include both the first damper portion 5 and the first support damper 30.

Referring to FIGS. 2, 23, and 24, the copper foil accommodation apparatus 1 according to the present disclosure may include a second support damper 40.

The second support damper 40 may be coupled to the second support portion 4. When the second support portion 4 is coupled to the accommodation body 2, the second support damper 40 may be disposed between the second support portion 4 and the accommodation body 2. The second support damper 40 may be formed of an elastically deformable material. For example, the second support damper 40 may be formed of rubber, urethane, or the like.

The second support damper 40 may be coupled to a second outer surface 43 of the second support portion 4. When the second support portion 4 is coupled to the accommodation body 2, the second outer surface 43 is a surface facing the accommodation body 2. Accordingly, when the second support portion 4 is coupled to the accommodation body 2, the second support damper 40 may be disposed between the second outer surface 43 and the accommodation body 2. Accordingly, the second support damper 40 may absorb vibrations, shaking, and the like being transferred through the accommodation body 2. Accordingly, the second support damper 40 may reduce the level of vibrations, shaking, and the like being transferred to the second support portion 4 so as to reduce the level of vibrations, shaking, and the like being transferred to the one side of the core 100. Accordingly, the copper foil accommodation apparatus 1 according to the present disclosure may reduce a defect rate of the copper foil 200 occurring due to vibrations, shaking, and the like which occur during the transportation process. Accordingly, the copper foil accommodation apparatus 1 according to the present disclosure may improve the quality of the copper foil 200 which has been transported as well as improve stability and ease of transport work for the copper foil 200.

The second support damper 40 may include a second support body 40*a* and a plurality of second support protrusions 40*b*.

The second support body 40*a* is disposed to face the accommodation body 2. When the second support portion 4 is coupled to the accommodation body 2, the second support body 40*a* may come into contact with the accommodation body 2.

The second support protrusions 40*b* protrude from the second support body 40*a*. The second support protrusions 40*b* may protrude from the second support body 40*a* toward the second support portion 4. The second support protrusions 40*b* may be disposed to be spaced apart from each other. Accordingly, the second support protrusions 40*b* may come into contact with mutually different parts of the second support portion 4. A contact area of the second support damper 40 which comes into contact with the second support portion 4 may be reduced using the second support protrusions 40*b*. Also, elastic deformation for each of the second support protrusions 40*b* may be further smoothly performed. Accordingly, the second support damper 40 may be implemented to further reduce the level of vibrations, shaking, or the like being transferred to the second support portion 4.

As shown in FIG. 23, the second support damper 40 may be coupled to the second support portion 4 to cover an entire surface of the second outer surface 43.

As shown in FIG. 24, the second support damper 40 may be coupled to the second support portion 4 to cover a part of the second outer surface 43. In this case, the copper foil accommodation apparatus 1 according to the present disclosure may include a plurality of such second support dampers 40. The second support dampers 40, 40', and 40" may be disposed on the second outer surface 43 at positions spaced apart from one another.

Although not shown in the drawing, the second support damper 40 may be implemented to include only the second support body 40*a* without the second support protrusions 40*b*. Although not shown in the drawings, the copper foil accommodation apparatus 1 according to the present disclosure may be implemented to include both the second damper portion 6 and the second support damper 40.

Referring to FIGS. 25 and 26, the first sidewall portion 8 may include a first sidewall groove 82 into which the core 100 is inserted. The first sidewall groove 82 may be formed in the first sidewall member 81. The first sidewall member 81 may be formed to have an open lower side due to the first sidewall groove 82. Accordingly, the one side of the core 100 may be inserted into the first sidewall groove 82 through the open lower side of the first sidewall member 81. The first sidewall groove 82 may be formed to have a semicircular shape as a whole but is not limited thereto, and the first sidewall groove 82 may be formed in other shapes as long as the core 100 can be inserted thereinto.

The first sidewall portion 8 may include a first sidewall surface 83. The first sidewall surface 83 may be formed in the first sidewall member 81. The first sidewall surface 83 may support the core 100 inserted into the first sidewall groove 82. The first sidewall surface 83 may be a surface of the first sidewall member 81 which faces the first sidewall groove 82. The first sidewall surface 83 may be formed to be a curved surface.

Here, the copper foil accommodation apparatus 1 according to the present disclosure may include a first sidewall damper 80 coupled to the first sidewall portion 8.

The first sidewall damper 80 may be coupled to the first sidewall member 81. When the first sidewall portion 8 is coupled to the accommodation body 2, the first sidewall damper 80 may be disposed between the first sidewall member 81 and the one side of the core 100. The first sidewall damper 80 may be formed of an elastically deformable material. For example, the first sidewall damper 80 may be formed of rubber, urethane, or the like. When the copper foil 200 wound on the core 100 is accommodated in the accommodation body 2 and then the first sidewall portion 8 is coupled to the accommodation body 2, the first sidewall damper 80 may be coupled to the first sidewall member 81 to be disposed above the one side of the core 100.

The first sidewall damper 80 may be coupled to the first sidewall surface 83 of the first sidewall portion 8. Accordingly, when the first sidewall portion 8 is coupled to the accommodation body 2, the first sidewall damper 80 may come into contact with the one side of the core 100. Accordingly, the first sidewall damper 80 may absorb vibrations, shaking, and the like being transferred through the accommodation body 2. Accordingly, the first sidewall damper 80 may reduce the level of vibrations, shaking, or the like being transferred to the one side of the core 100. Accordingly, the copper foil accommodation apparatus 1 according to the present disclosure may reduce a defect rate of the copper foil 200 occurring due to vibrations, shaking, and the like which occur during the transportation process. Accordingly, the copper foil accommodation apparatus 1 according to the present disclosure may improve the quality of the copper foil 200 which has been transported as well as improve stability and ease of transport work for the copper foil 200.

The first sidewall damper 80 may include a first sidewall body 80*a* and a plurality of first sidewall protrusions 80*b*.

The first sidewall body 80*a* is coupled to the first sidewall portion 8. The first sidewall body 80*a* may be coupled to the first sidewall surface 83. The first sidewall body 80*a* may be coupled to the first sidewall surface 83 using an adhesive force. The first sidewall body 80*a* may be coupled to the first sidewall surface 83 using an additional first coupling member (not shown). The first coupling member may be inserted into the first sidewall body 80*a* and the first sidewall member 81 between the first sidewall protrusions 80*b* so as to fix the first sidewall damper 80 to the first sidewall member 81. For example, the first coupling member may be implemented as a staple or the like which is fixedly insertable into the first sidewall body 80*a* and the first sidewall member 81.

The first sidewall protrusions 80*b* protrude from the first sidewall body 80*a*. The first sidewall protrusions 80*b* may be disposed to be spaced apart from each other. Accordingly, the first sidewall protrusions 80*b* may come into contact with mutually different parts of the one side of the core 100. A contact area of the first sidewall damper 80 which comes into contact with the one side of the core 100 may be reduced using the first sidewall protrusions 80*b*. Also, elastic deformation for each of the first sidewall protrusions 80*b* may be further smoothly performed. Accordingly, the first sidewall damper 80 may be implemented to further reduce the level of vibrations, shaking, or the like being transferred to the one side of the core 100. The first sidewall protrusions 80*b* may be formed to have a rectangular parallelepiped shape as a whole but is not limited thereto, and may be formed in other shapes capable of reducing the level of vibrations, shaking, and the like being transferred to the one side of the core 100. For example, the first sidewall protrusions 80*b* may be formed to have a size which is reduced when gradually protruding from the first sidewall body 80*a*. In this case, parts of the first sidewall protrusions 80*b* which come into contact with the one side of the core 100 may be formed to have curved surfaces.

As shown in FIG. 26, the first sidewall damper 80 may be coupled to the first sidewall member 81 to cover an entire surface of the first sidewall surface 83. In this case, the first sidewall protrusions 80*b* may be disposed to be spaced apart from each other along a curvature of the first sidewall surface 83.

Although not shown in the drawing, the first sidewall damper 80 may be coupled to the first sidewall member 81 to cover a part of the first sidewall surface 83. In this case, the copper foil accommodation apparatus 1 according to the present disclosure may include a plurality of such first sidewall dampers 80. The first sidewall dampers 80 may be disposed to be spaced apart from each other along the first sidewall surface 83. Modified examples of the first damper portion 5 shown in FIGS. 15 to 20 may be equally applied to the first sidewall damper 80.

Referring to FIGS. 27 and 28, the second sidewall portion 9 may include a second sidewall groove 92 into which the core 100 is inserted. The second sidewall groove 92 may be formed in the second sidewall member 91. The second sidewall member 91 may be formed to have an open lower side due to the second sidewall groove 92. Accordingly, the other side of the core 100 may be inserted into the second sidewall groove 92 through the open lower side of the second sidewall member 91. The second sidewall groove 92 may be formed to have a semicircular shape as a whole but is not limited thereto, and the second sidewall groove 92 may be formed in other shapes as long as the core 100 can be inserted thereinto.

The second sidewall portion 9 may include a second sidewall surface 93. The second sidewall surface 93 may be formed in the second sidewall member 91. The second sidewall surface 93 may support the core 100 inserted into the second sidewall groove 92. The second sidewall surface 93 may be a surface of the second sidewall member 91 which faces the second sidewall groove 92. The second sidewall surface 93 may be formed to be a curved surface.

Here, the copper foil accommodation apparatus 1 according to the present disclosure may include a second sidewall damper 90 coupled to the second sidewall portion 9.

The second sidewall damper 90 may be coupled to the second sidewall member 91. When the second sidewall portion 9 is coupled to the accommodation body 2, the second sidewall damper 90 may be disposed between the second sidewall member 91 and the other side of the core 100. The second sidewall damper 90 may be formed of an elastically deformable material. For example, the second sidewall damper 90 may be formed of rubber, urethane, or the like. When the copper foil 200 wound on the core 100 is accommodated in the accommodation body 2 and then the second sidewall portion 9 is coupled to the accommodation body 2, the second sidewall damper 90 may be coupled to the second sidewall member 91 to be disposed above the other side of the core 100.

The second sidewall damper 90 may be coupled to the second sidewall surface 93 of the second sidewall portion 9. Accordingly, when the second sidewall portion 9 is coupled to the accommodation body 2, the second sidewall damper 90 may come into contact with the other side of the core 100. Accordingly, the second sidewall damper 90 may absorb vibrations, shaking, and the like being transferred through the accommodation body 2. Accordingly, the second sidewall damper 90 may reduce the level of vibrations, shaking, or the like being transferred to the other side of the core 100. Accordingly, the copper foil accommodation apparatus 1 according to the present disclosure may reduce a defect rate of the copper foil 200 occurring due to vibrations, shaking, and the like which occur during the transportation process. Accordingly, the copper foil accommodation apparatus 1 according to the present disclosure may improve the quality of the copper foil 200 which has been transported as well as improve stability and ease of transport work for the copper foil 200.

The second sidewall damper 90 may include a second sidewall body 90*a* and a plurality of second sidewall protrusions 90*b*.

The second sidewall body 90*a* is coupled to the second sidewall portion 9. The second sidewall body 90*a* may be coupled to the second sidewall surface 93. The second sidewall body 90*a* may be coupled to the second sidewall surface 93 using an adhesive force. The second sidewall body 90*a* may be coupled to the second sidewall surface 93 using an additional second coupling member (not shown). The second coupling member may be inserted into the second sidewall body 90*a* and the second sidewall member 91 between the second sidewall protrusions 90*b* so as to fix the second sidewall damper 90 to the second sidewall member 91. For example, the second coupling member may be implemented as a staple or the like which is fixedly insertable into the second sidewall body 90*a* and the second sidewall member 91.

The second sidewall protrusions 90*b* protrude from the second sidewall body 90*a*. The second sidewall protrusions 90*b* may be disposed to be spaced apart from each other. Accordingly, the second sidewall protrusions 90*b* may come into contact with mutually different parts of the other side of the core 100. A contact area of the second sidewall damper 90 which comes into contact with the other side of the core 100 may be reduced using the second sidewall protrusions 90*b*. Also, elastic deformation for each of the second sidewall protrusions 90*b* may be further smoothly performed. Accordingly, the second sidewall damper 90 may be implemented to further reduce the level of vibrations, shaking, or the like being transferred to the other side of the core 100. The second sidewall protrusions 90*b* may be formed to have a rectangular parallelepiped shape as a whole but is not limited thereto, and may be formed in other shapes capable of reducing the level of vibrations, shaking, and the like being transferred to the other side of the core 100. For example, the second sidewall protrusions 90*b* may be formed to have a size which is reduced when gradually protruding from the second sidewall body 90*a*. In this case, parts of the second sidewall protrusions 90*b* which come into contact with the other side of the core 100 may be formed to have curved surfaces.

As shown in FIG. 28, the second sidewall damper 90 may be coupled to the second sidewall member 91 to cover an entire surface of the second sidewall surface 93. In this case, the second sidewall protrusions 90*b* may be disposed to be spaced apart from each other along a curvature of the second sidewall surface 93.

Although not shown in the drawing, the second sidewall damper 90 may be coupled to the second sidewall member 91 to cover a part of the second sidewall surface 93. In this case, the copper foil accommodation apparatus 1 according to the present disclosure may include a plurality of such second sidewall dampers 90. The second sidewall dampers 90 may be disposed to be spaced apart from each other along the second sidewall surface 93. Modified examples of the first damper portion 5 shown in FIGS. 15 to 20 may be equally applied to the second sidewall damper 90.

While the exemplary embodiments of the present disclosure and their advantages have been described in detail with reference to the accompanying drawings, it will be apparent to those skilled in the art to which the present disclosure belongs that various changes, substitutions and alterations may be made herein without departing from the scope of the present disclosure.

The invention claimed is:

1. An apparatus, comprising:

a copper foil wound on a core;

an accommodation body defining an accommodation space configured to accommodate the copper foil;

a first support portion coupled to the accommodation body;

a second support portion coupled to the accommodation body and spaced apart from the first support portion;

a first damper portion disposed on the first support portion on which a first side of the core rests; and a second damper portion disposed on the second support portion on which a second side of the core rests, wherein the first damper portion comprises:

a first damper body coupled to the first support portion, a plurality of first damper protrusions protruding from the first damper body, and a plurality of first damper grooves formed in the first damper portion, wherein the plurality of first damper grooves is placed at an opposite side of the plurality of first damper protrusions in the first damper body, and wherein a part of the first damper portion other than the plurality of first damper grooves is coupled to the first support portion, wherein each first damper protrusion of the plurality of first damper protrusions is spaced apart from other first damper protrusions of the plurality of first damper protrusions in a first direction, wherein each first damper groove of the plurality of first damper grooves is spaced apart from other first damper grooves of the plurality of first damper grooves in a second direction, wherein the first support portion has a curved surface, wherein the first damper portion is disposed on the curved surface, wherein each first damper protrusion of the plurality of first damper protrusions extends along a thickness direction of the first support portion, wherein each first damper groove of the plurality of first damper grooves extends along a direction perpendicular to the thickness direction of the first support portion, wherein the thickness direction of the first support portion is parallel to the second direction, wherein a spacing of the first plurality of protrusions places a first protrusion of the first plurality of protrusions at a first distance from a second protrusion of the first plurality of protrusions, the second protrusion at a second distance from a third protrusion of the first plurality of protrusions, and the first protrusion at a third distance from the third protrusion, wherein the first protrusion is located on the damper body more centrally along the first direction than the second protrusion, wherein the second protrusion is located on the damper body more centrally along the first direction than the third protrusion, wherein the second protrusion is disposed between the first protrusion and the third protrusion, and no other protrusion of the first plurality of protrusions is disposed between the first protrusion and the third protrusion, and wherein the first distance is less than the second distance.

2. The apparatus of claim 1, wherein the first support portion comprises a first insertion member inserted into the accommodation body and a first reduction groove formed in the first insertion member, and wherein the accommodation body comprises a first insertion groove, wherein a part of the first insertion member other than the first reduction groove is inserted into the first insertion groove.

3. The apparatus of claim 1, wherein each of first damper protrusion of the plurality of first damper protrusions contacts different parts of the core than each other.

4. The apparatus of claim 1, wherein the first damper portion covers an entirety of the curved surface.

5. The apparatus of claim 1, wherein the first damper portion cover less than all of the curved surface.

6. The apparatus of claim 1, wherein the first damper portion is one of a plurality of first damper portions that are coupled to the first support portion, and wherein each first damper portion of the plurality of first damper portions is coupled to the first support surface at a different position such that the plurality of first damper portions are spaced apart from each other.

7. The apparatus of claim 1, further comprising:

a first auxiliary damper coupled to the first support portion, wherein each first damper protrusion of the plurality of first damper protrusions is spaced apart from other first damper protrusions of the plurality of first damper protrusions and come into partial contact with the core, and wherein an entire surface of the first auxiliary damper contacts the core.

8. The apparatus of claim 1, comprising a first support damper coupled to the first support portion disposed between the first support portion and the accommodation body, wherein the first support damper is formed of an elastically deformable material.

9. The apparatus of claim 1, further comprising:

a first sidewall portion detachably coupled to one side of the accommodation body; and a first sidewall damper coupled to the first sidewall portion and disposed to face the first damper portion, wherein the first sidewall damper comprises a first sidewall body coupled to the first sidewall portion and a plurality of first sidewall protrusions protruding from the first sidewall body, and wherein each first sidewall protrusion of the plurality of first sidewall protrusions is spaced apart from other first sidewall protrusions of the plurality of first sidewall protrusions and contact different parts of the core.

10. The apparatus of claim 1, wherein the second damper portion comprises:

a second damper body coupled to the second support portion, a plurality of second damper protrusions protruding from the second damper body, and a plurality of second damper grooves formed in the second damper portion, wherein the plurality of second damper grooves is placed at an opposite side of the plurality of second damper protrusions in the second damper body, and a part of the second damper portion other than the plurality of second damper grooves is coupled to the second support portion, wherein each second damper protrusion of the plurality of second damper protrusions is spaced apart from other second damper protrusions of the plurality of second damper protrusions in the first direction, wherein each second damper groove of the plurality of second damper grooves is spaced apart from other second damper grooves of the plurality of second damper grooves in the second direction, wherein the second support portion has a curved surface; and wherein the second damper portion is disposed on the curved surface, and wherein each second damper protrusion of the plurality of second damper protrusions extends along a thickness direction of the second support portion, wherein each second damper groove of the plurality of second damper grooves extends along a direction perpendicular to the thickness direction of the second support portion, and wherein the thickness direction of the second support portion is parallel to the second direction.

11. The apparatus of claim 10, wherein the first damper portion is a same size as the second damper portion.

12. An apparatus, comprising:

a copper foil wound on a core, wherein the core has a first side and a second side, opposite to the first side;

an accommodation body defining an accommodation space configured to accommodate the copper foil;

a first support portion coupled to the accommodation body and defining a first curved surface;

a second support portion coupled to the accommodation body and spaced apart from the first support portion and defining a second curved surface;

a first damper portion disposed on the first curved surface, wherein the first side of the core contacts the first damper portion; and a second damper portion disposed on the second curved surface, wherein the second side of the core contacts the second damper portion, wherein each of the first damper portion and the second damper portion comprises:

a damper body having a first side and a second side, opposite to the first side in a thickness direction, the damper body having a length that defines a length direction and a width defining a width direction, perpendicular along the damper body to the length direction;

a first plurality of protrusions extending the width of the damper body from the first side of the damper body, wherein each protrusion of the first plurality of protrusions is spaced apart in the length direction from other protrusions of the first plurality of protrusions;

a second plurality of protrusions extending the length of the damper body from the second side of the damper body, wherein each protrusion of the second plurality of protrusions is spaced apart in the width direction from other protrusions of the second plurality of protrusions;

wherein a spacing of the first plurality of protrusions places a first protrusion of the first plurality of protrusions at a first distance from a second protrusion of the first plurality of protrusions, the second protrusion at a second distance from a third protrusion of the first plurality of protrusions, and the first protrusion at a third distance from the third protrusion;

wherein the first protrusion is located on the damper body more centrally along the length direction than the second protrusion;

wherein the second protrusion is located on the damper body more centrally along the length direction than the third protrusion;

wherein the second protrusion is disposed between the first protrusion and the first protrusion, and no other protrusion of the first plurality of protrusions is disposed between the first protrusion and the third protrusion; and wherein the first distance is less than the second distance.

13. The apparatus of claim 12, wherein each protrusion of the first plurality of protrusions defines a rectangular parallelepiped shape.

14. The apparatus of claim 12, wherein parts of each protrusion of the first plurality of protrusions that are in contact with the core are curved in shape.

15. The apparatus of claim 12, wherein the second plurality of protrusions is shaped to define a plurality of damper grooves, each damper groove of the plurality of damper grooves being defined between two protrusions of the second plurality of protrusions and having a rectangular parallelepiped shape.

16. The apparatus of claim 12, wherein each protrusion of the second plurality of protrusions reduces in size in a direction extending away from the damper body.

* * * * *